United States Patent
Otsuka

(10) Patent No.: US 8,896,859 B2
(45) Date of Patent: Nov. 25, 2014

(54) PRINTER AND SCANNER UTILIZING A FILE SHARING PROTOCOL

(75) Inventor: Naoki Otsuka, Konan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1891 days.

(21) Appl. No.: 12/076,579

(22) Filed: Mar. 20, 2008

(65) Prior Publication Data

US 2008/0239387 A1   Oct. 2, 2008

(30) Foreign Application Priority Data

Mar. 30, 2007   (JP) ................. 2007-091335

(51) Int. Cl.
- G06F 15/00 (2006.01)
- H04N 1/00 (2006.01)
- G06F 3/12 (2006.01)

(52) U.S. Cl.
CPC .......... *H04N 1/00233* (2013.01); *G06F 3/1204* (2013.01); *G06F 3/1206* (2013.01); *G06F 3/127* (2013.01); *G06F 3/1285* (2013.01); *G06F 3/1292* (2013.01); *H04N 1/00222* (2013.01); *H04N 1/00225* (2013.01); *H04N 2201/0015* (2013.01); *H04N 2201/0094* (2013.01); *H04N 2201/33314* (2013.01); *H04N 2201/33321* (2013.01); *H04N 2201/33328* (2013.01); *H04N 2201/33335* (2013.01)
USPC ........................................ 358/1.15; 358/1.16

(58) Field of Classification Search
CPC ...................................... G06F 3/127
USPC .............................. 358/1.15, 1.16
See application file for complete search history.

(56) References Cited

U.S. PATENT DOCUMENTS

| 7,061,633 B1 | 6/2006 | Shima |
| 2002/0046238 A1* | 4/2002 | Estavillo et al. ............. 709/203 |
| 2003/0161670 A1 | 8/2003 | Watanabe et al. |

(Continued)

FOREIGN PATENT DOCUMENTS

| CN | 1483584 A | 3/2004 |
| EP | 1 176 500 A1 | 1/2002 |

(Continued)

OTHER PUBLICATIONS

European Search Report issued in European Patent Application No. EP 08 25 1115, mailed Sep. 2, 2008.

(Continued)

*Primary Examiner* — Vu B Hang
*Assistant Examiner* — Mark Milia
(74) *Attorney, Agent, or Firm* — Banner & Witcoff, Ltd.

(57) ABSTRACT

A printer includes a print setting folder storage area, a data sending device, a data receiving device, and a print device. The print setting folder storage area may store print setting folders. Each print setting folder may associate print setting data and a print setting folder address. The data sending device may send the print setting folder address of each print setting folder to an information processing device. The data receiving device may receive combination data from the information processing device. The combination data may include a data file and a data file storage command that may include a print setting folder address. Where the data receiving device receives the combination data, the print device may print the data file included in the combination data in accordance with the print setting data associated with the print setting folder address. A scanner may have a similar configuration to the printer.

13 Claims, 23 Drawing Sheets

(56) References Cited

U.S. PATENT DOCUMENTS

| | | |
|---|---|---|
| 2004/0057073 A1 | 3/2004 | Egawa et al. |
| 2004/0257614 A1 | 12/2004 | Tanimoto |
| 2007/0005561 A1 | 1/2007 | Sakura et al. |

FOREIGN PATENT DOCUMENTS

| | | |
|---|---|---|
| JP | 09-034661 A | 2/1997 |
| JP | 2000-022879 A | 1/2000 |
| JP | 2000-276313 A | 10/2000 |
| JP | 2002-373064 | 12/2002 |
| JP | 2003-256165 A | 9/2003 |
| JP | 2005-010857 A | 1/2005 |
| JP | 2005-242781 | 9/2005 |
| JP | 2005-324464 A | 11/2005 |
| JP | 2007-011576 A | 1/2007 |
| JP | 2007-026002 A | 2/2007 |

OTHER PUBLICATIONS

CN Office Action dtd Jan. 29, 2010, CN App. 200810090739.0, English translation.

JP Office Action dtd Jun. 7, 2011, Jp Application No. 2007-091335; English Translation.

\* cited by examiner

FIG. 4

| Address (a,b,c) | Setting Reflected Image Data |
|---|---|
| (A4,Portrait,Normal) | A4 ← 72a |
| (A4,Landscape,Normal) | A4 ← 72b |
| (B4,Portrait,Normal) | B4 ← 72c |
| (B4,Landscape,Normal) | B4 ← 72d |
| (A4,Portrait,2in1) | 1 2 ← 72e | a: Size ( A4, B4, ··· )

b: Orientation ( Portrait, Landscape )

c: n in 1 ( Normal(1 in 1), 2 in 1 ··· )

FIG. 17

|  | Operation on PC | Command |
|---|---|---|
| (1) | Double Click→ Object204(See FIG.5) | PROPFIND Including"/printer" |
| (2) | Double Click→ Object206(See FIG.5) | PROPFIND Including"/scanner" |
| (3) | Double Click→ Object82a(See FIG.5) | GET Including "/printer/new_settings.html" |
| (4) | Double Click→ Object230,240,250,260(See FIG.8) | PROPFIND Including "/printer/folder name" |
| (5) | Double Click→ Object270,280,290(See FIG.8) | PROPFIND Including "/scanner/folder name" |
| (6) | Double Click→ Object92a(See FIG.7) | GET Including "/printer/folder name/settings.html" |
| (7) | Click→ OK Button226,326(See FIG.6,FIG9) | POST Including "/printer/new_settings.html" or "/printer/folder name/settings.html" |
| (8) | D&D→Data File400,420 (See FIG.11,FIG.13) into Folder | PUT Including "/printer/folder name" |
| (9) | Copy→Data File162a(See FIG.16) to Another Area | GET Including "/scanner/folder name" |

PRINTER AND SCANNER UTILIZING A FILE SHARING PROTOCOL

CROSS-REFERENCE TO RELATED APPLICATION

This application claims priority to Japanese Patent Application No. 2007-091335, filed on Mar. 30, 2007, the contents of which are hereby incorporated by reference into the present application.

BACKGROUND OF THE INVENTION

1. Field of the Invention

The present invention relates to a printer and a scanner capable of communicating with an information processing device utilizing a file sharing protocol.

2. Description of the Related Art

Many personal computers (hereafter termed PC) are capable of performing communication utilizing a file sharing protocol. For example, Windows (registered trademark) of the Microsoft Corporation is capable of performing communication utilizing the WebDAV (Web Distributed Authoring and Versioning) file sharing protocol.

A printer that communicates with a PC utilizing the Web-DAV protocol is disclosed in Japanese Patent Application Publication No. 2002-373064. The printer creates a print folder, and sends a folder address thereof to the PC. The PC can thus display a folder object corresponding to the folder address from the printer. A user can cause a data file of a print subject to be stored in the folder object. In this case, the PC sends the data file and a data file storage command to the printer. When the printer receives the data file storage command, the printer prints the data file.

Further, Japanese Patent Application Publication No. 2005-242781 does not utilize a file sharing protocol, but discloses a technique utilizing a hot folder application. The hot folder application is installed in a PC. A user can create a hot folder in the PC, the hot folder being associated with a network address of a printer. Further, the user can store a print setting data file in the hot folder, print setting data being described in the print setting data file. When a data file of a print subject is stored in the hot folder, the PC adds the print setting data file that is being stored in the hot folder to the data file of the print subject, and sends this to the printer. The printer can thus print the data file in accordance with the print setting data file from the PC.

BRIEF SUMMARY OF THE INVENTION

Many printers have an operation panel that allows a user to input print setting data, and are capable of storing the print setting data that has been input. For example, in the case where this method is adopted in Japanese Patent Application Publication No. 2002-373064, when the printer receives a data file storage command, the printer performs printing in accordance with print setting data that it is storing. With this method, however, the user must input the print setting data to the operation panel each time printing is to be performed.

By contrast, in the technique of Japanese Patent Application Publication No. 2005-242781, the user can store a plurality of hot folders in the PC. The user can create print setting data files of a plurality of patterns that are frequently utilized, and can store one print setting data file in each hot folder. In this case, by storing a data file in a hot folder that is storing a desired print setting data file, the user can cause that data file to be printed in accordance with that print setting data (file). The user does not need to input the print setting data each time printing is to be performed.

However, when the data file has been stored in the hot folder, the PC taught in Japanese Patent Application Publication No. 2005-242781 adds the print setting data file to the data file, and sends this to the printer. In order to add the print setting data file to the data file stored in the folder and send this to the printer, a special application (the hot folder application) must be installed in the PC. The aforementioned method can not be realized in the case where only a file sharing protocol is being utilized that is supported by a normal OS such as Windows (registered trademark). A technique has not been established that allows the user to easily utilize desired print setting data when a data file of a print subject is to be communicated utilizing a file sharing protocol.

A technique is taught in the present specification that allows the user to easily utilize desired setting data.

One technique disclosed in the present specification is a printer that is capable of communicating with an information processing device by utilizing a file sharing protocol. The printer may comprise a print setting folder storage area, a data sending device, a data receiving device, and a print device. The print setting folder storage area may be capable of storing a plurality of print setting folders. Each print setting folder may be an association of print setting data and a print setting folder address.

The data sending device may be capable of sending the print setting folder address of each print setting folder stored in the print setting folder storage area to the information processing device. In this case, the information processing device is capable of displaying a folder object corresponding to each print setting folder. A user can store a data file of a print subject in a folder object corresponding to desired print setting data. The data file and a data file storage command are thus sent from the information processing device to the printer. Moreover, the data sending device may send the print setting folder address to the information processing device in accordance with a request (command) from the information processing device, or may send the print setting folder address to the information processing device at a predetermined timing (at regular intervals, for example).

The data receiving device may be capable of receiving combination data sent from the information processing device. The combination data may include a data file storage command and a data file. The data file storage command may include a print setting folder address. That is, the data file storage command may include the folder address of the folder object in which the data file of the print subject is stored. As a result, the printer can know whether a data file has been stored in any of the print setting folders. In the case where the combination data is received by the data receiving device, the print device may print the data file included in the combination data in accordance with the print setting data associated with the print setting folder address included in the combination data.

With this technique, it is possible to send a data file of a print subject from the information processing device to the printer utilizing the file sharing protocol. Moreover, a user can easily utilize desired print setting data from among the plurality of patterns of print setting data that are being stored by the printer.

The term "sending an address" should be interpreted in its broadest sense. For instance, in the case where an entire character string constituting a print setting folder address is "aaa/bbb/ccc", the term "sending an address" is not restricted merely to a case of sending the address "aaa/bbb/ccc", but is defined to also include the case of sending "bbb/ccc" or "ccc". That is, the term "sending an address" is defined to include the case of sending the absolute address and also a case of sending the relational address.

Moreover, there are no particular restrictions on the method for storing the print setting data in the printer. For example, the print setting data may be input to the information processing device by operating an operation device of the information processing device, and this print setting data may be stored in the printer. Further, for example, the print setting data may be input to the printer by operating an operation device of the printer, and this print setting data may be stored in the printer. Further, for example, the print setting data may be stored as default data in the printer (i.e. the print setting data may be stored in the printer in advance by the manufacturer).

One technique disclosed in the present specification is a scanner that is capable of communicating with an information processing device by utilizing a file sharing protocol. The scanner taught in the present specification may comprise a scan setting folder storage area, a data sending device, a data receiving device, and a scan device. The scan setting folder storage area may be capable of storing a plurality of scan setting folders. Each scan setting folder may be an association of scan setting data and a scan setting folder address. The data sending device may be capable of sending the scan setting folder address of each scan setting folder stored in the scan setting folder storage area to the information processing device. The information processing device can consequently display a folder object corresponding to each scan setting folder. The user can perform a predetermined operation on the folder object (for example, the user can copy a file within the folder to another location). A predetermined command may thus be sent from the information processing device to the scanner. This predetermined command may include the scan setting folder address corresponding to the folder object on which the operation was performed. The data receiving device may be capable of receiving the predetermined command that includes the scan setting folder address. In the case where the predetermined command is received by the data receiving device, the scan device may perform scanning in accordance with the scan setting data associated with the scan setting folder address included in the predetermined command.

With this technique, it is possible for the information processing device to order the scanner to perform scanning utilizing a file sharing protocol. The user can easily utilize desired scan setting data from among the plurality of patterns of scan setting data that are being stored in the scanner.

BRIEF DESCRIPTION OF THE DRAWINGS

FIG. 4 shows an example of stored contents of a setting reflected image storage area.
FIG. 17 shows a table of correspondences between operations performed on the PC and commands.

DETAILED DESCRIPTION OF THE PREFERRED EMBODIMENT

Embodiments

Figure 1:
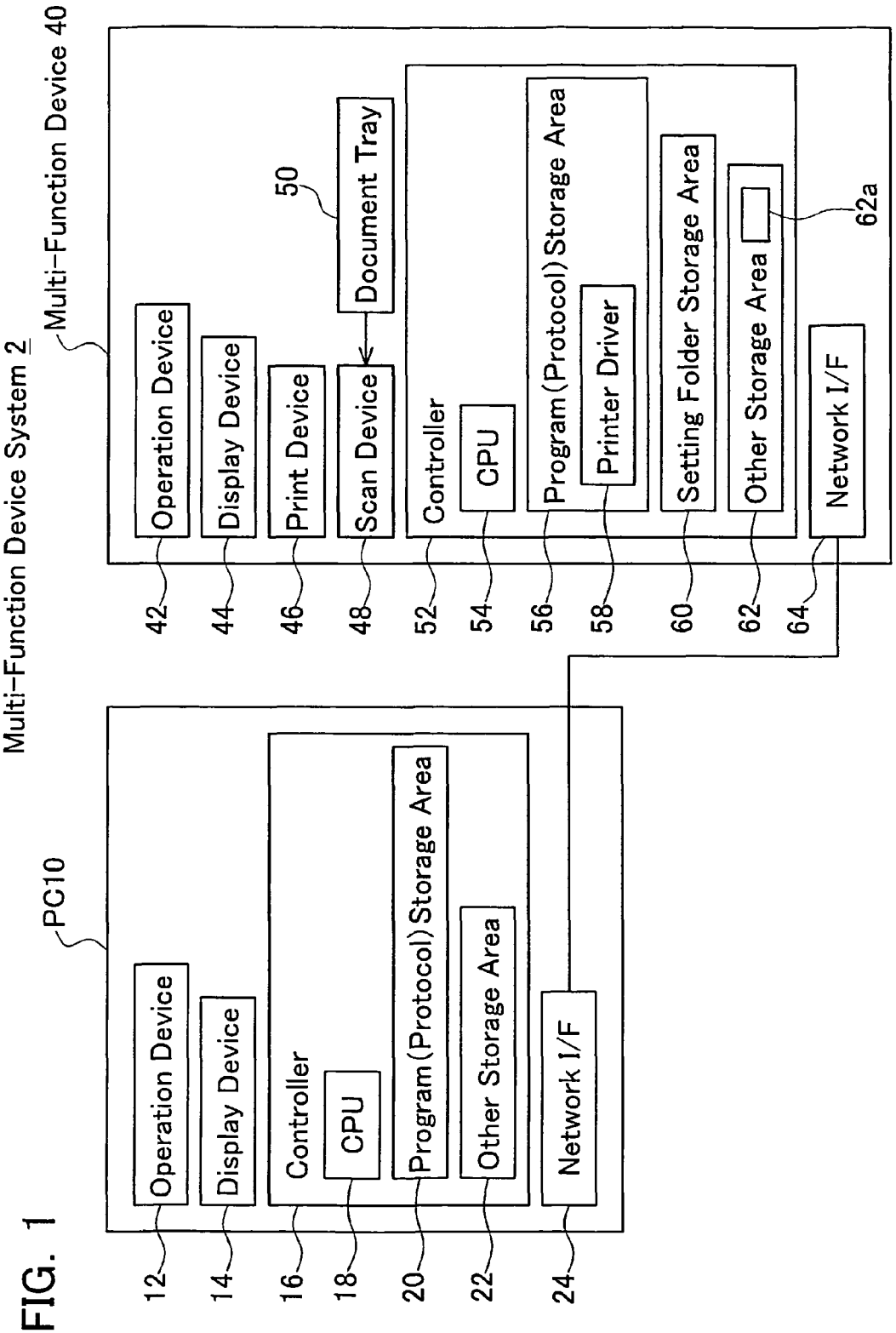
FIG. 1 shows a schematic view of a multi-function device system.

The present embodiment will be described with reference to figures. FIG. 1 shows the configuration of a multi-function device system 2 of the present embodiment. The multi-function device system 2 comprises a personal computer (termed PC below) 10, a multi-function device 40, etc. The configuration of the PC 10 and the multi-function device 40 will each be described in sequence below.
(Configuration of PC)

The PC 10 comprises an operation device 12, a display device 14, a controller 16, a network interface 24, etc. The operation device 12 consists of a keyboard and a mouse. The display device 14 consists of a liquid crystal display. The controller 16 comprises a CPU 18, a program storage area 20, and another storage area 22. The CPU 18 executes processes in accordance with various programs stored in the program storage area 20. The program storage area 20 stores various programs. An OS of the PC 10 of the present embodiment is described below using Windows (registered trademark) of the Microsoft Corporation as an example. Windows (registered trademark) supports the WebDAV protocol. As a result, a program for executing a communication process utilizing the WebDAV protocol is stored in the program storage area 20. Moreover, although the widely-known Windows (registered trademark) operating system is being utilized as the OS of the PC 10 in the present embodiment, another type of OS may be utilized. In this case, a file sharing protocol other than the WebDAV protocol may be utilized. The other storage area 22 is capable of storing various data created during the processes executed by the CPU 18. The network interface 24 is connected to the multi-function device 40. The PC 10 is capable of communicating with the multi-function device 40 via the network interface 24. The PC 10 is capable of communicating with the multi-function device 40 utilizing the WebDAV protocol. Moreover, the PC 10 and the multi-function device 40 may be connected by the internet, or may be connected by a local area network.

(Configuration of Multi-Function Device)

The multi-function device 40 comprises an operation device 42, a display device 44, a print device 46, a scan device 48, a document tray 50, a controller 52, a network interface 64, etc. The operation device 42 has a plurality of keys. The display device 44 is capable of displaying information. The print device 46 is capable of printing on paper in accordance with bitmap data created by a printer driver 58 (to be described). Further, the print device 46 is capable of printing on paper in accordance with scan data created by the scan device 48 (to be described). That is, the multi-function device 40 is capable of realizing a copy function. The scan device 48 scans a document mounted on the document tray 50, and creates image data. The controller 52 comprises a CPU 54, a program storage area 56, a setting folder storage area 60, and another storage area 62, etc. The CPU 54 executes processes in accordance with various programs stored in the program storage area 56. The program storage area 56 stores various programs. A program for executing a communication process utilizing the WebDAV protocol is stored in the program storage area 56. Further, the program storage area 56 stores a program (the printer driver 58) for rasterizing a data file sent from the PC 10 and creating bitmap data.

Figure 2:
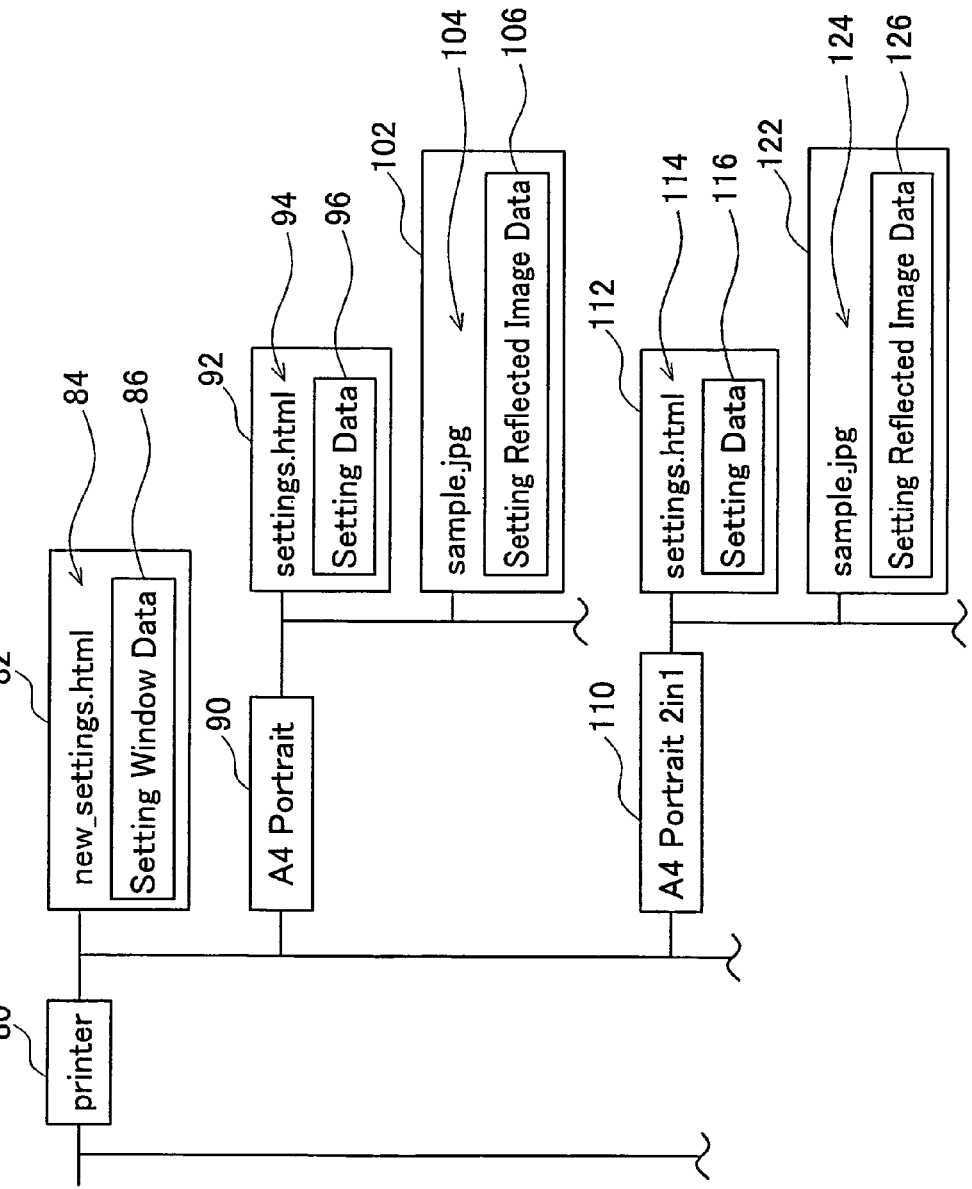
FIG. 2 shows an example of stored contents of a setting folder storage area.
Figure 3:
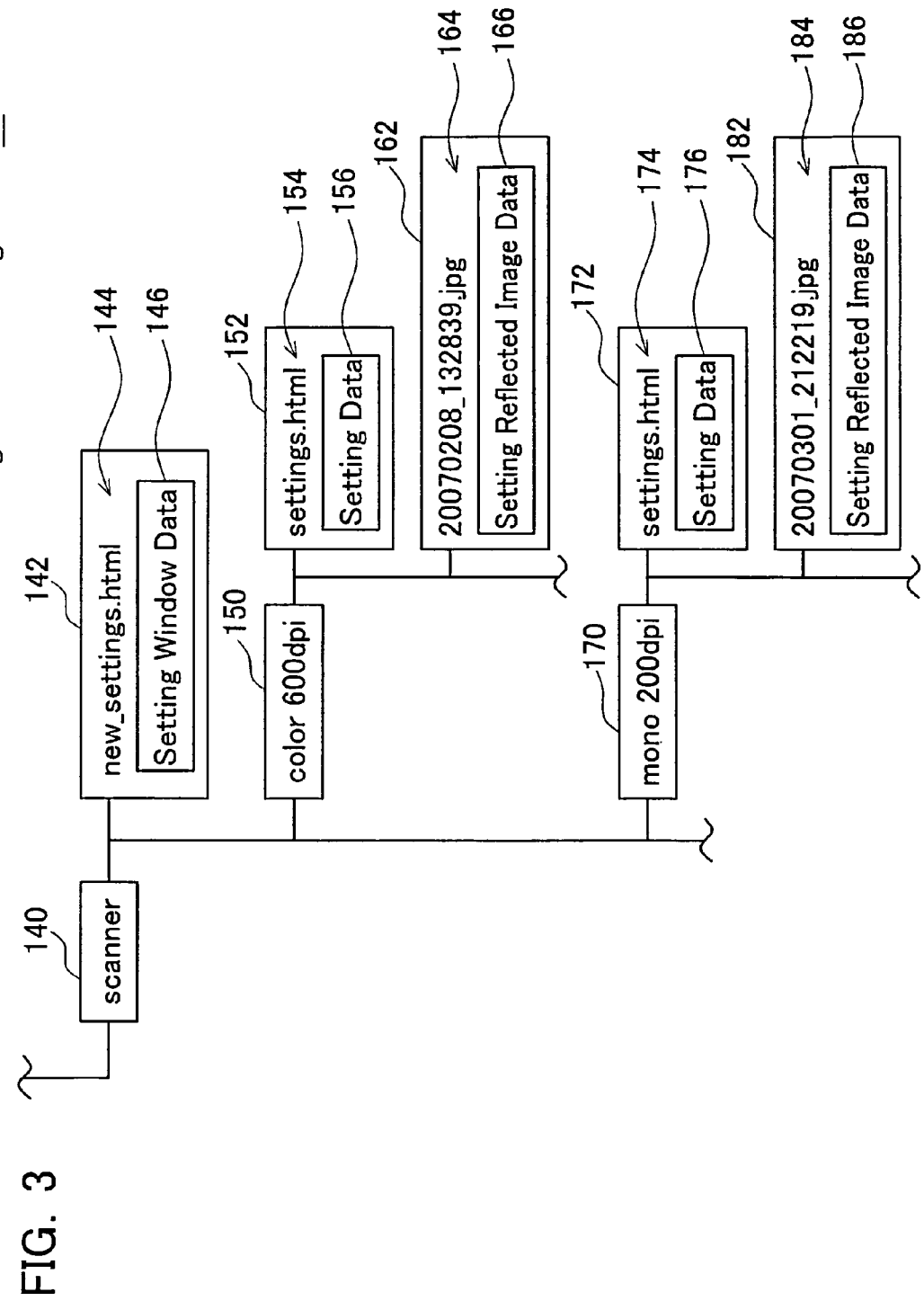
FIG. 3 shows an example of stored contents of the setting folder storage area.

The setting folder storage area 60 stores data. The PC 10 is capable of accessing the stored contents of the setting folder storage area 60. FIG. 2 and FIG. 3 show examples of the stored contents of the setting folder storage area 60. The setting folder storage area 60 stores a plurality of folders (and files) that have a hierarchical structure. Top folders stored in the setting folder storage area 60 are a folder 80 (see FIG. 2) and a folder 140 (see FIG. 3). The folder 80 has a folder address (folder name) "printer". The folder 140 has a folder address (folder name) "scanner".

As shown in FIG. 2, a file 82 exists as a subordinate file of the folder 80. The file 82 is an association of a file address (file name) 84 "new_settings.html" and setting window data 86. The specific contents of the setting window data 86 will be described in detail later. Moreover, as described above, the file 82 is a subordinate file of the folder 80. As a result, the actual file address 84 has the folder address of the folder 80 (i.e. printer) as its superior address. That is, the actual file address 84 is "printer/new_settings.html". However, in the present embodiment, the file address 84 may simply be called "new_settings.html". Below, folder addresses and file addresses may be described in a format in which the superior address is omitted.

In the example of FIG. 2, a folder 90, a folder 110, etc. exist as subordinate folders of the folder 80. The folder 90 has the folder address (folder name) "A4 Portrait". A file 92 and a file 102 exist as subordinate files of the folder 90. The file 92 is an association of a file address (file name) 94 "settings.html" and setting data 96. The specific contents of the setting data 96 will be described in detail later. The file 102 is an association of a file address (file name) 104 "sample.jpg" and setting reflected image data 106. The specific contents of the setting reflected image data 106 will be described in detail later. The folder 110 has the folder address "A4 Portrait 2 in 1". A file 112 and a file 122 exist as subordinate files of the folder 110. The file 112 is an association of a file address 114 "settings.html" and setting data 116. The file 122 is an association of a file address 124 "sample.jpg" and setting reflected image data 126.

As shown in FIG. 3, a file 142 exists as a subordinate file of the folder 140. The file 142 is an association of a file address 144 "new_settings.html" and setting window data 146. In the example of FIG. 3, a folder 150, a folder 170, etc. exist as subordinate folders of the folder 140. The folder 150 has the folder address "color 600 dpi". A file 152 and a file 162 exist as subordinate files of the folder 150. The file 152 is an association of a file address 154 "settings.html" and setting data 156. The file 162 is an association of a file address 164 "20070208_132839.jpg" and setting reflected image data 166. The file address 164 has the date and time on which the file 162 was created added thereto. That is, in the case of this example, the file 162 was created on Feb. 8, 2007, at the time 13:28:39. The folder 170 has the folder address "mono 200 dpi". A file 172 and a file 182 exist as subordinate files of the folder 170. The file 172 is an association of a file address 174 "settings.html" and setting data 176. The file 182 is an association of a file address 184 "20070301_212219.jpg" and setting reflected image data 186.

The storage area 62 shown in FIG. 1 is capable of storing data created while processes are executed by the CPU 54. Further, the storage area 62 has a setting reflected image storage area 62a. FIG. 4 shows an example of stored contents of the setting reflected image storage area 62a. The setting reflected image storage area 62a stores an association of an address 70 and setting reflected image data 72. The address 70 is a character string in which three items of print setting (a, b, c) have been combined. "a" is paper size, "b" is paper orientation, and "c" is how many pages of data are to be printed in one page (below, this may be termed "Multiple Pages"). That is, "c" refers to "N in 1". For example, an address 70a "A4, Portrait, Normal" means that one page of data will be printed on a sheet of A4 size paper in portrait (vertical) layout. Further, for example an address 70e "A4, Portrait, 2 in 1" means that two pages of data will be printed on a sheet of A4 size paper. In this case, "portrait" means that one page of data will be printed vertically. That is, one page of data will be printed vertically in the left half of a horizontal sheet of paper, and one page of data will be printed vertically in the right half thereof. One setting reflected image data 72a to 72e is associated respectively with the addresses 70a to 70e. The setting reflected image data 72a to 72e is image data to which the print setting shown in the corresponding addresses 70a to 70e is reflected. For example, the setting reflected image data 72a associated with the address 70a is image data showing a portrait layout of paper including the characters A4. Further, for example, the setting reflected image data 72e associated with the address 70e is image data showing that two pages of data are printed on one page.

The network interface 64 shown in FIG. 1 is connected to the PC 10. The multi-function device 40 is capable of communicating with the PC 10 via the network interface 64. The multi-function device 40 is capable of communicating with the PC 10 utilizing the WebDAV protocol.

(User Operations and Data Displayed by PC)

Figure 5:
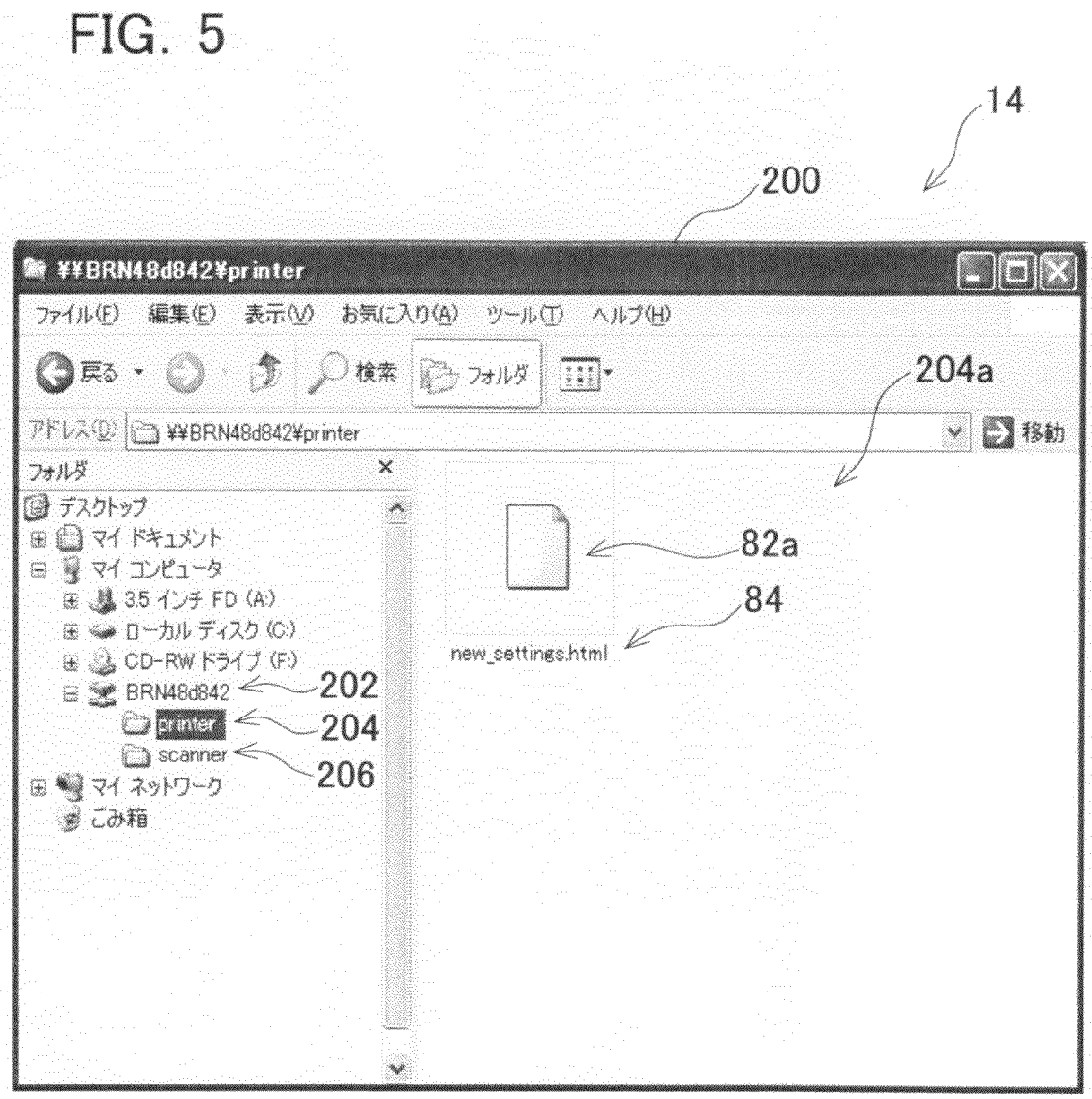
FIG. 5 shows a subordinate file of a "printer" folder.

Next, operations that the user can execute on the PC 10 and data displayed by the PC 10 will be described. Moreover, objects (described below) are displayed on the PC 10 by communicating various commands and responses between the PC 10 and the multi-function device 40. The contents of data displayed on the PC 10 will be described first, and then the commands and responses will be described. FIG. 5 shows an example of a window 200 displayed by the display device 14 of the PC 10. Moreover, FIG. 5 is based on Explorer (file management software) included in Windows (registered trademark) of the Microsoft Corporation. A device object 202 displayed in the window 200 corresponds to the multi-function device 40. The PC 10 is capable of searching for devices present on the network that are connected to this PC 10. As a result, the PC 10 can know that the multi-function device 40 is present, and can display the device object 202.

The user can operate the mouse of the operation device 12 (see FIG. 1) to double click on the device object 202. Folder objects 204 and 206 are thus displayed in the window 200. The folder objects 204 and 206 correspond to the top folders stored in the setting folder storage area 60 of the multi-function device 40. That is, the folder object 204 corresponds to the folder 80 (see FIG. 2), and the folder object 206 corresponds to the folder 140 (see FIG. 3). The user can double click on the folder object 204. As a result, a file object 82a is displayed in a display area 204a that refers to the contents of the folder object 204. The file object 82a corresponds to the file 82 (see FIG. 2). The file object 82a has the file address (file name) 84 "new_settings.html".

Figure 6:
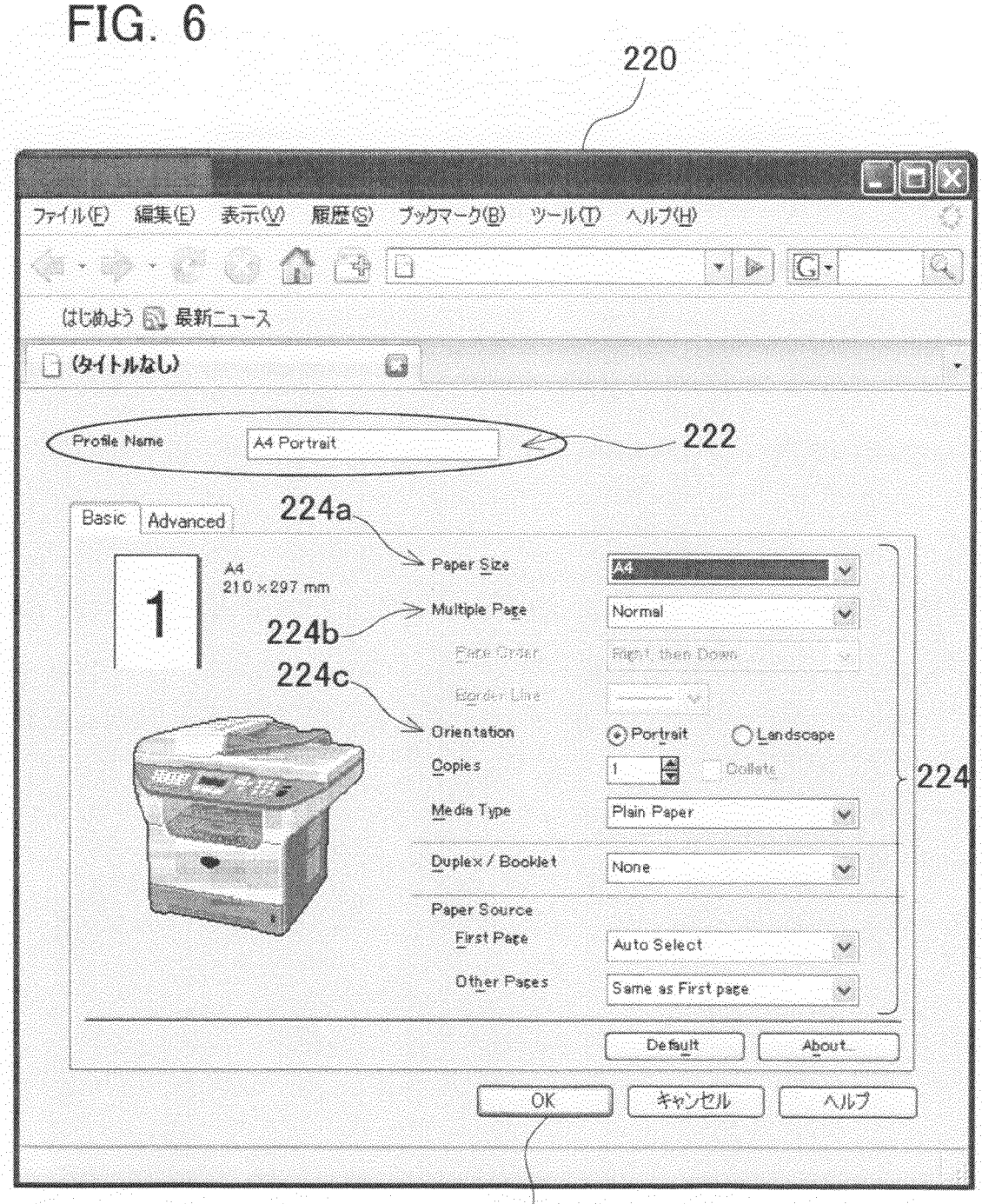
FIG. 6 shows an example of a print setting window.

The user can double click on the file object 82a, whereby a print setting window 220 shown in FIG. 6 is displayed. Moreover, FIG. 6 is based on the MOZILLA company's browser FIREFOX (registered trademark). The print setting window 220 comprises a text input area 222, a print setting data input area 224, an OK button 226, etc. The user can input desired text into the text input area 222 by operating the keyboard of the operation device 12 (see FIG. 1). In the example of FIG. 6, the text "A4 Portrait" has been input. A plurality of items of print setting data is to be input to the print setting data input area 224. For example, paper size 224a, multiple page (N in 1) 224b, paper orientation 224c, etc. are to be input. The user can input the desired print setting data 224a, 224b, 224c, etc. into the print setting data input area 224. The user can click on the OK button 226. The folder 90 that is a subordinate folder of the folder 80 shown in FIG. 2, and the files 92 and 102 that are subordinate files of the folder 90 are thus created in the multi-function device 40. The address of the folder 90 includes the text "A4 Portrait" that was input to the text input area 222. Further, the setting data 96 of the file 92 comprises the print setting data 224a, 224b, 224c, etc. that was input to the print setting window 220.

Figure 7:
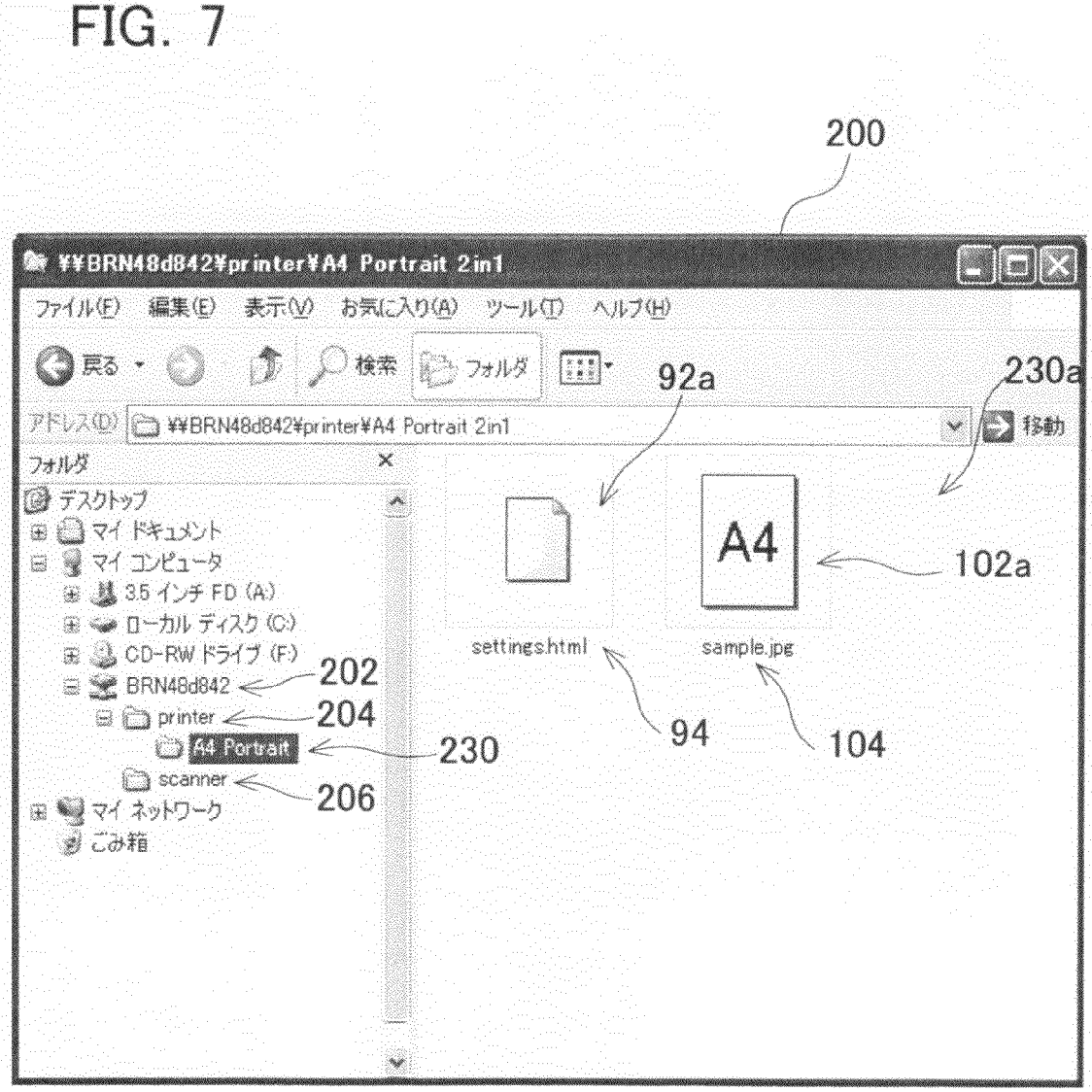
FIG. 7 shows subordinate files of an "A4 Portrait" folder.

After the folder 90 has been created, the user can double click on the folder object 204 (see FIG. 5). In this case, as shown in FIG. 7, a folder object 230 is displayed that refers to a subordinate folder of the folder object 204. Moreover, like FIG. 5, FIG. 7 is based on Explorer (file management software) included in Windows (registered trademark) of the Microsoft Corporation. The folder object 230 corresponds to the folder 90 (see FIG. 2). The user can double click on the folder object 230. As a result, file objects 92a and 102a are displayed in a display area 230a that refers to the interior of the folder object 230. The file object 92a corresponds to the file 92 (see FIG. 2). The file object 92a has the address (file name) 94 "settings.html". The file object 102a corresponds to the file 102 (see FIG. 2). The displayed contents of the file object 102a ("A4 Portrait" in the example of FIG. 7) depend on the setting reflected image data 106 of the file 102. The file object 102a has the address (file name) 104 "sample.jpg".

Figure 8:
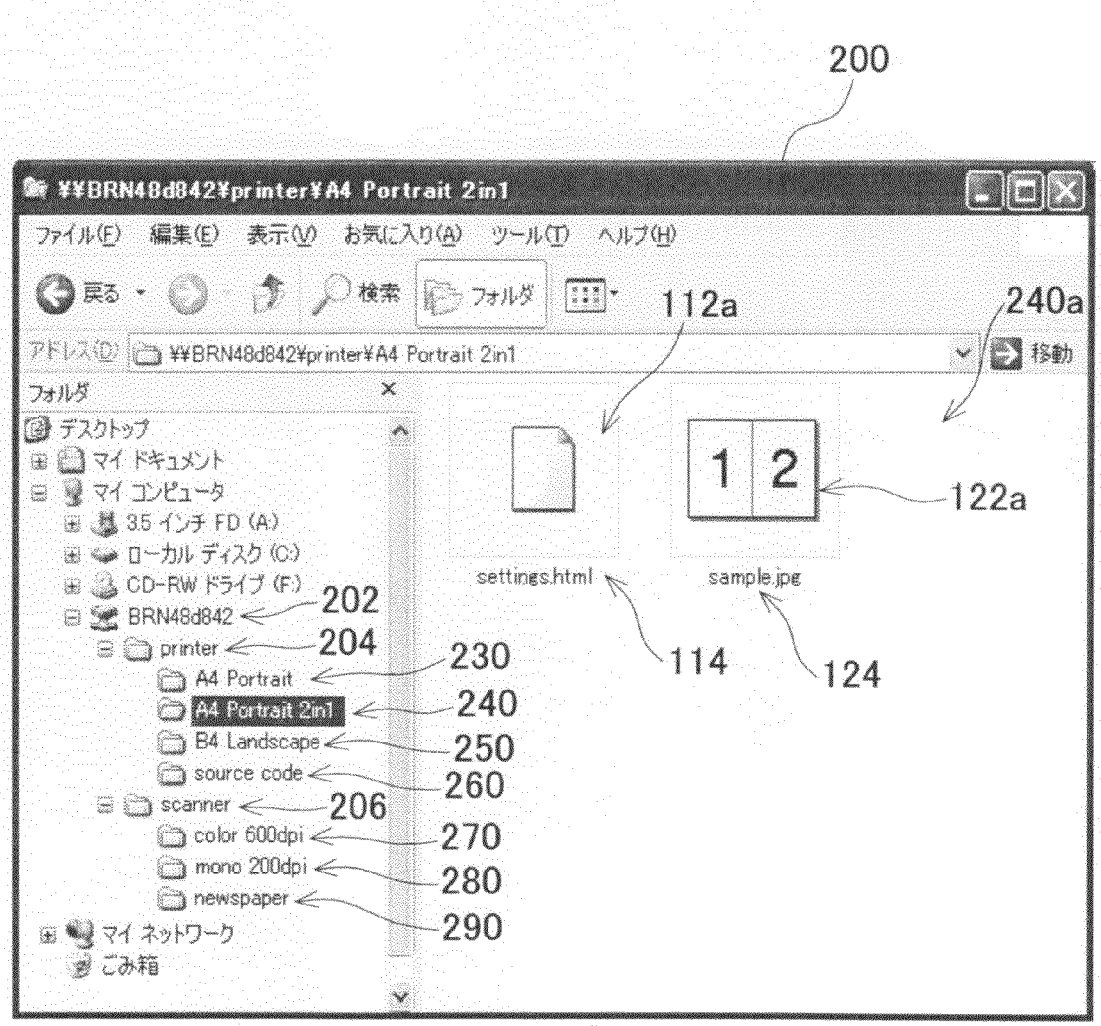
FIG. 8 shows subordinate files of an "A4 Portrait 2 in 1" folder.

As described above, by double clicking on the file object 82a shown in FIG. 5, and inputting the print setting data to the print setting window 220, the user can create the subordinate folder 90 (see FIG. 2) of the folder 80. By repeating this operation, the user can create another subordinate folder 110 (see FIG. 2). As a result, as shown in FIG. 8, a plurality of folder objects 230, 240, 250, and 260 are displayed as subordinate folders of the folder object 204. Moreover, like FIG. 5, etc. FIG. 8 is based on Explorer (file management software) included in Windows (registered trademark) of the Microsoft Corporation. The folder object 240 corresponds to the folder 110 shown in FIG. 2. Moreover, the folders corresponding to the folder objects 250 and 260 are not shown in FIG. 2.

FIG. 8 shows an example of a display when the folder object 240 has been double clicked on. That is, file objects 112a and 122a are displayed in a display area 240a that refers to the interior of the folder object 240. The file object 112a corresponds to the file 112 (see FIG. 2). The file object 112a has the address (file name) 114 "settings.html". The file object 122a corresponds to the file 122 (see FIG. 2). The displayed contents of the file object 122a ("2 in 1" in the example of FIG. 8) depend on the setting reflected image data 126 of the file 122. The file object 122a has the address (file name) 124 "sample.jpg".

Figure 9:
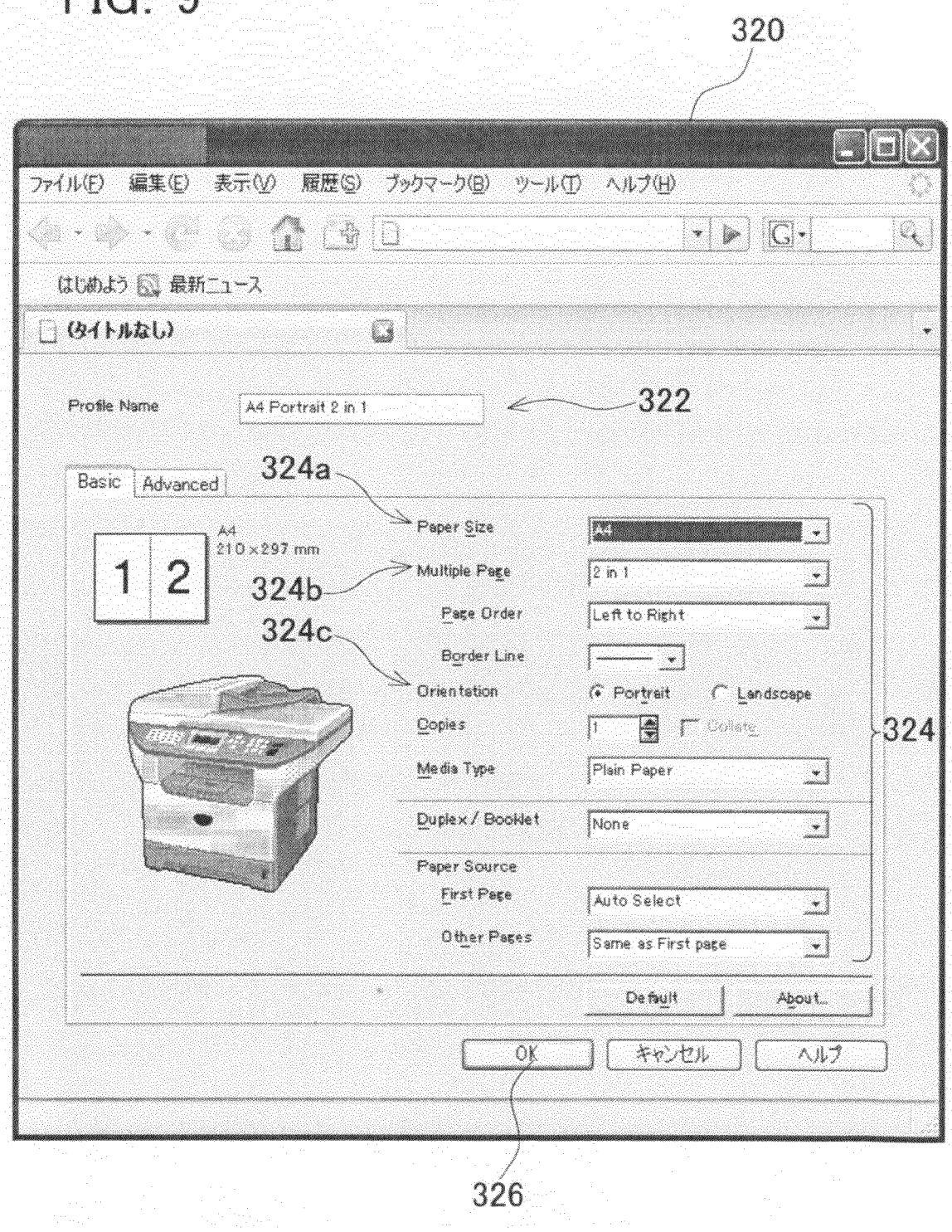
FIG. 9 shows an example of the print setting window.

The user can double click on the file object 112a, whereby a print setting window 320 shown in FIG. 9 is displayed. Moreover, like FIG. 6, FIG. 9 is based on the MOZILLA company's browser FIREFOX (registered trademark). A text input area 322 of the print setting window 320 is displaying the text "A4 Portrait 2 in 1" that was earlier input by the user. Further, a print setting data input area 324 displays print setting data 324a, 324b, 324c, etc. that was earlier input by the user. The user can change the text in the text input area 322 and change the print setting data 324a, 324b, 324c, etc. After adding the changes, the user can click on an OK button 326. The address, the setting data 116, the setting reflected image data 126, etc., of the folder 110 (see FIG. 2) are thus updated in the multi-function device 40. Specifically, the folder 110 is deleted, and a new folder (a folder corresponding to the updated setting data) is created.

Figure 10:
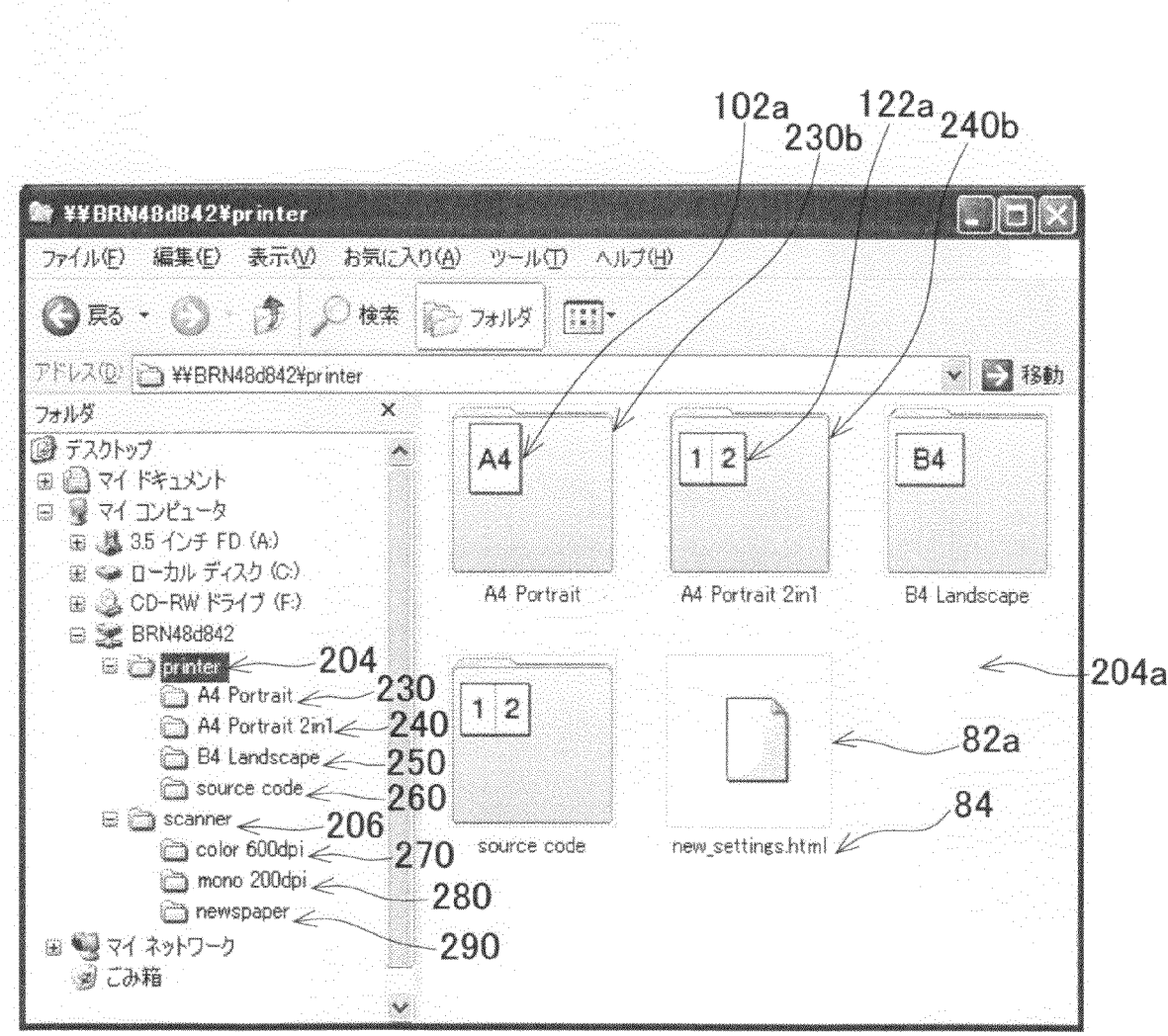
FIG. 10 shows subordinate folders and a subordinate file of the "printer" folder.

Only the file object 82a is displayed in a display area 204a shown in FIG. 5. This means that the folder 80 (see FIG. 2) in the multi-function device 40 does not have any subordinate folders. As described above, when the folders 90 and 110 (see FIG. 2) have been created by the user, objects corresponding to the folders 90 and 110 are displayed in the display area 204a. FIG. 10 shows how the objects corresponding to the folders 90 and 110 are displayed in the display area 204a. Moreover, like FIG. 5, etc. FIG. 10 is based on Explorer (file management software) included in Windows (registered trademark) of the Microsoft corporation. Folder objects 230b, 240b, etc. are displayed in the display area 204a. The folder object 230b corresponds to the folder 90. The file object 102a (see FIG. 7) is overlapped on the folder object 230b. The folder object 240b corresponds to the folder 110. The file object 122a (see FIG. 8) is overlapped on the folder object 240b.

Figure 11:
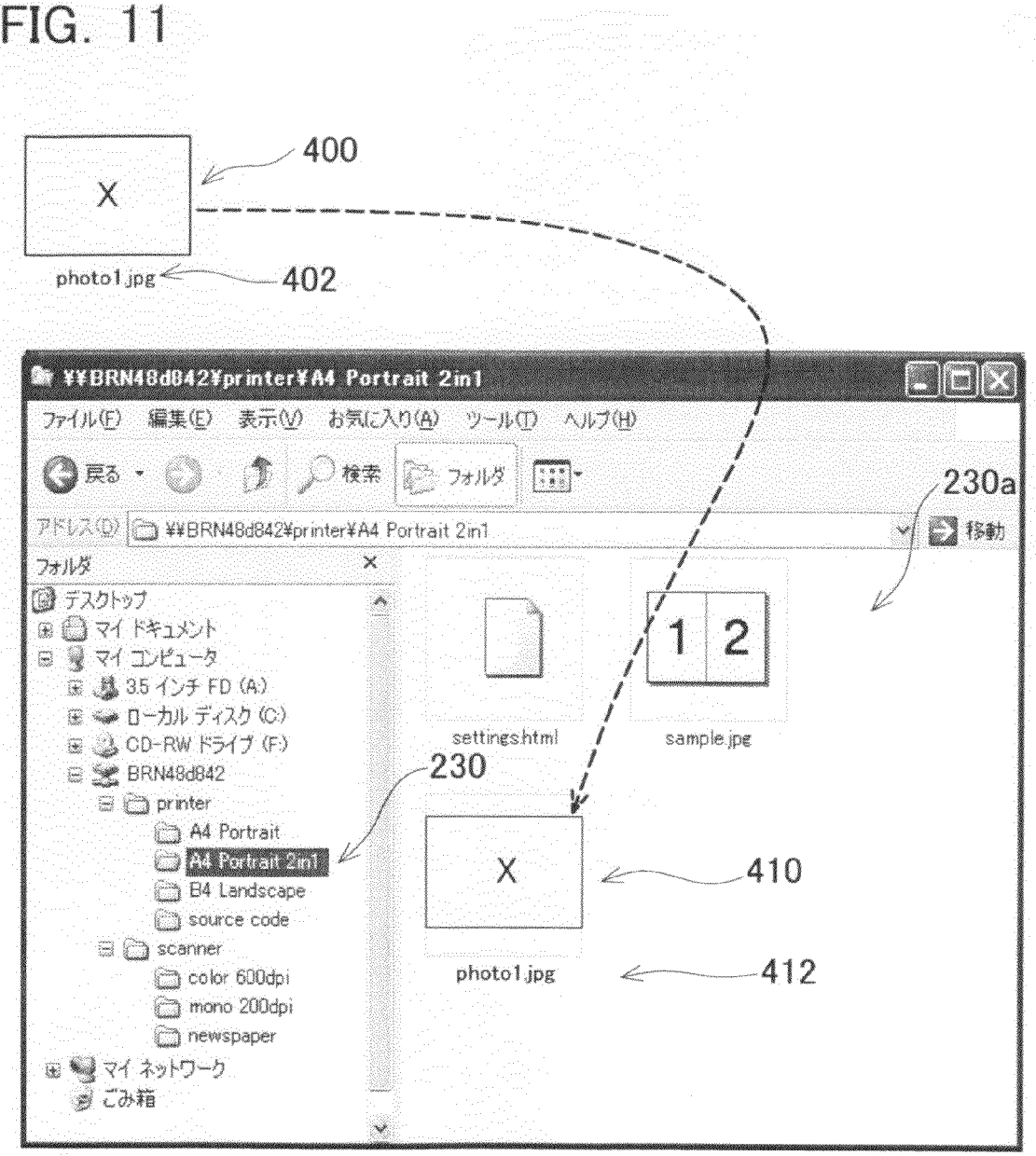
FIG. 11 shows how an image file object is dragged and dropped into the "A4 Portrait 2 in 1" folder.

In the case where a data file is to be printed, the user executes the following operations. First, the user selects the folder corresponding to the desired print setting data. In the case, for example, where the data file is to be printed utilizing "A4 Portrait 2 in 1", the user double clicks on the folder object 240 (see FIG. 8, etc.). In this case, as shown in FIG. 11, the display area 230a is displayed. Moreover, like FIG. 5, etc. FIG. 11 is based on Explorer (file management software) included in Windows (registered trademark) of the Microsoft Corporation. In FIG. 11, a file object 400 is displayed that corresponds to a data file of a print subject. This data file is a JPEG image data file, and has an address (file name) 402 "photo.jpg". The user can drag and drop the file object 400 into the display area 230a. When the file object 400 has been stored in the display area 230a, the PC 10 is capable of displaying a thumbnail file object 410 within the display area 230a. The thumbnail file object 410 has an address (file name) 412 "photo.jpg".

In the example of FIG. 11, the user has selected multiple pages (2 in 1) print setting data. In the case of this print setting data, the multi-function device 40 prints two pages of data on one page. One JPEG image data file is treated as data for one page. As a result, because only one page of data is present, the multi-function device 40 does not begin printing even when the drag and drop shown in FIG. 11 has been performed.

Figure 12:
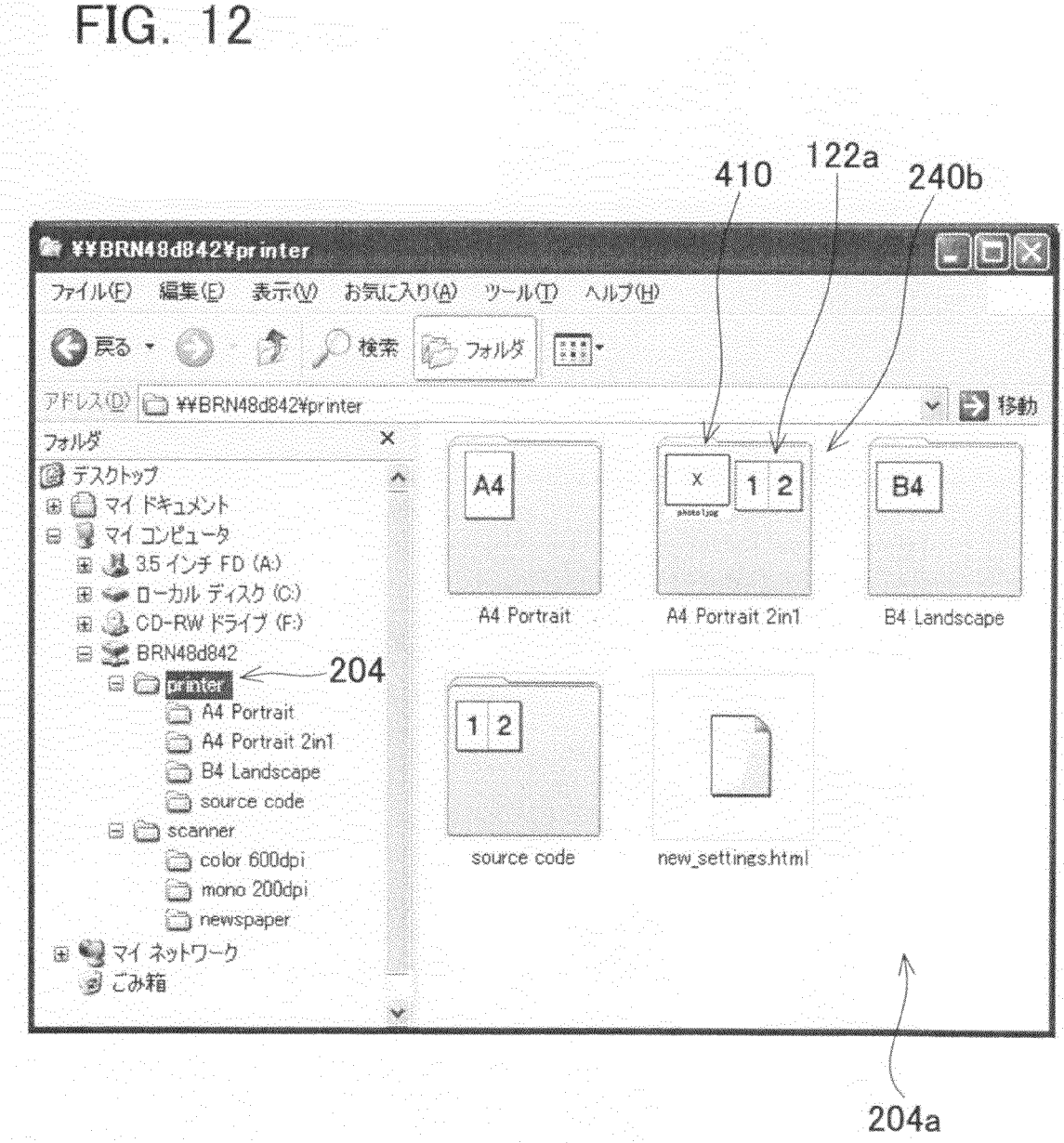
FIG. 12 shows subordinate folders and a subordinate file of the "printer" folder.

Moreover, in FIG. 12, the display area 204*a* is shown when the folder object 204 that is in this state has been double clicked on. Moreover, like FIG. 5, etc., FIG. 12 is based on Explorer (file management software) included in Windows (registered trademark) of the Microsoft Corporation. The file object 122*a* and the thumbnail file object 410 are overlapped on the folder object 240*b*. In this state, the thumbnail file object 410 shows an address (file name) "photo.jpg".

Figure 13:
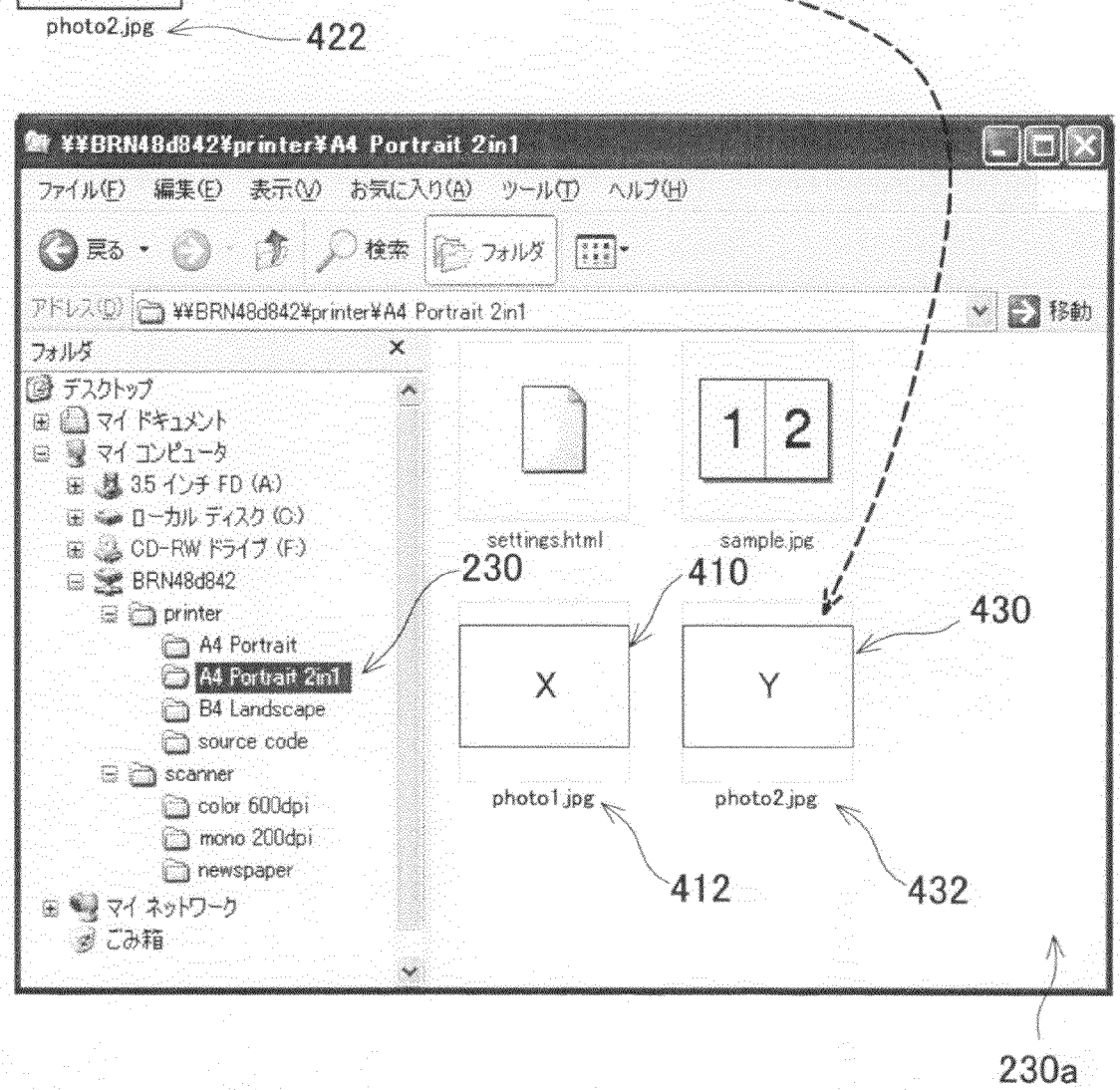
FIG. 13 shows how an image file object is dragged and dropped into the "A4 Portrait 2 in 1" folder.
Figure 14:
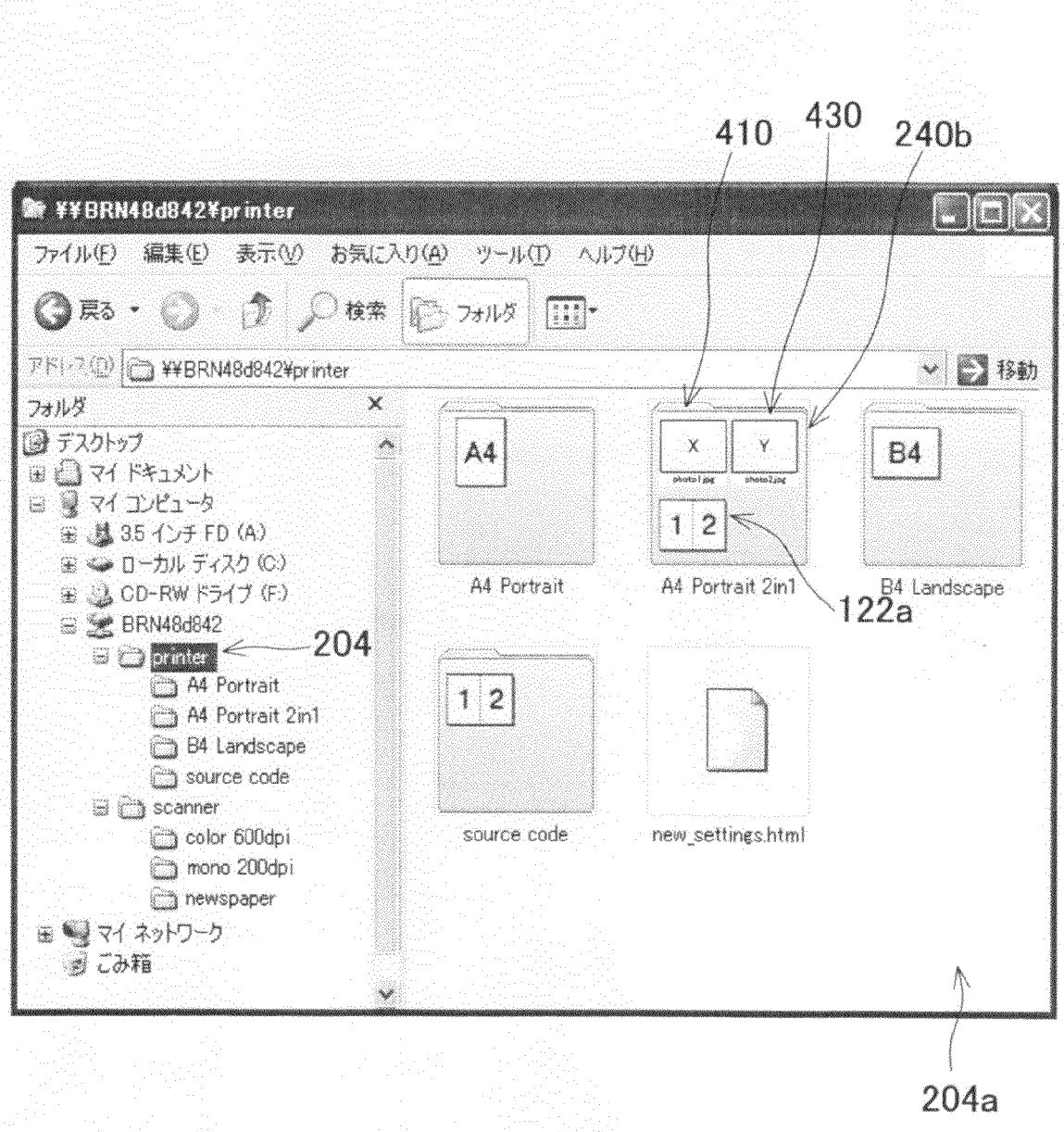
FIG. 14 shows subordinate folders and a subordinate file of the "printer" folder.

A file object 420 corresponding to another data file of a print subject is shown in FIG. 13. Moreover, like FIG. 5, etc., FIG. 13 is based on Explorer (file management software) included in Windows (registered trademark) of the Microsoft Corporation. This data file is a JPEG image data file, and has an address (file name) 422 "photo2.jpg". The user can drag and drop the file object 420 into the display area 230*a*. When the file object 420 has been stored in the display area 230*a*, the PC 10 is capable of displaying a thumbnail file object 430 within the display area 230*a*. The thumbnail file object 430 has an address (file name) 432 "photo2.jpg". Two pages of data have been gathered when the file object 420 has been dragged and dropped into the display area 230*a*, and consequently the multi-function device 40 can execute the multiple page (2 in 1) printing. Moreover, in FIG. 14, the display area 204*a* is shown when the object 204 that is in this state has been double clicked on. Moreover, like FIG. 5, etc., FIG. 14 is based on Explorer (file management software) included in Windows (registered trademark) of the Microsoft Corporation. The file object 122*a*, the thumbnail file object 410, and the thumbnail file object 430 are overlapped on the folder object 240*b*. In this state, the thumbnail file object 430 shows an address (file name) "photo2.jpg".

Figure 15:
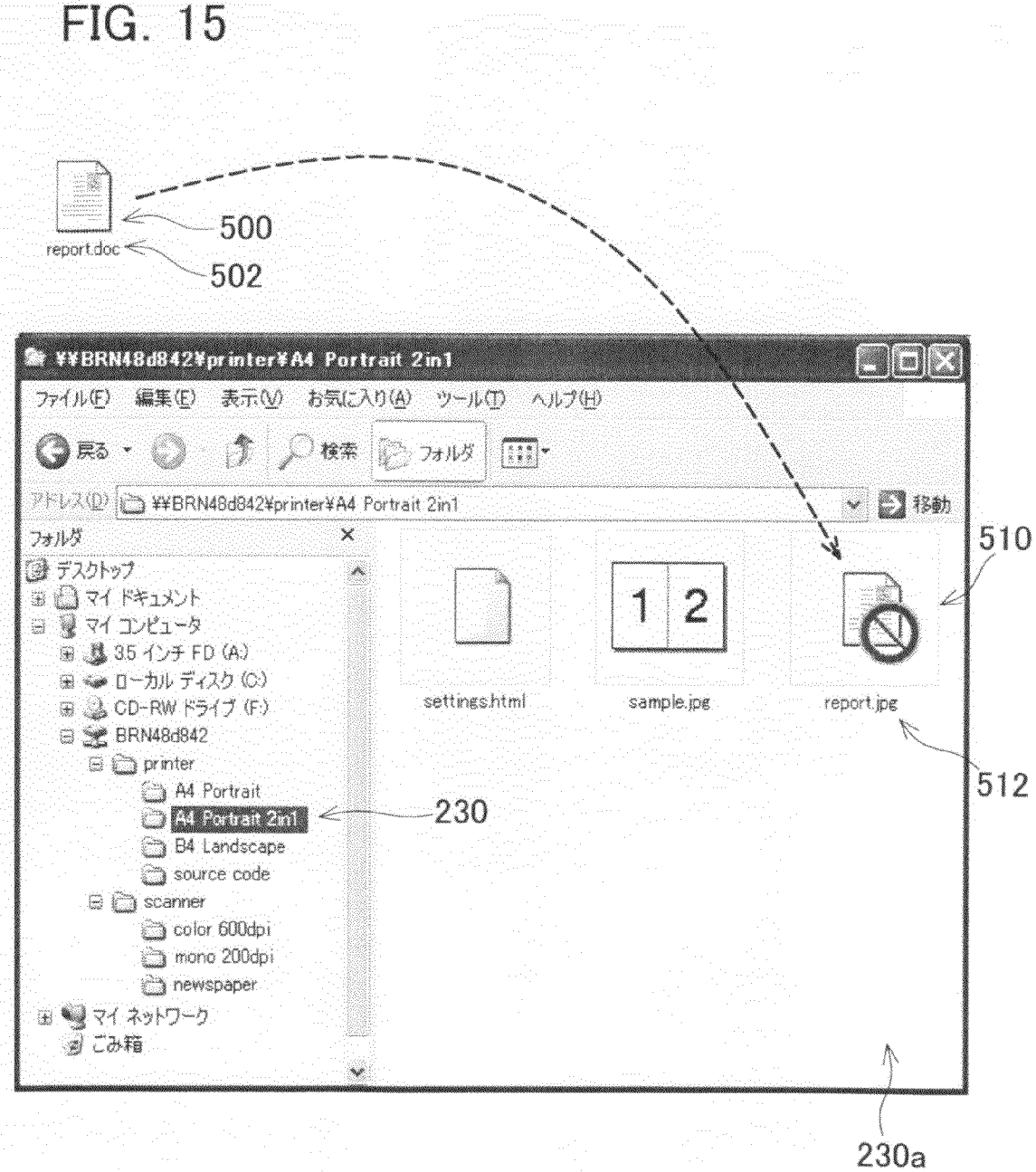
FIG. 15 shows how a document file object is dragged and dropped into the "A4 Portrait 2 in 1" folder.

The printer driver 58 (see FIG. 1) of the multi-function device 40 is capable of creating bitmap data by rasterizing a JPEG, etc. image data file. However, the printer driver 58 is not capable of rasterizing data files of all formats. There are formats of data files that the printer driver 58 is not capable of handling. For example, the printer driver 58 is not capable of handling document file data that has been created by word processing software. A file object 500 that corresponds to document file data is displayed in FIG. 15. Moreover, like FIG. 5, etc., FIG. 15 is based on Explorer (file management software) included in Windows (registered trademark) of the Microsoft Corporation. This document file data has an address (file name) 502 "report.doc". Even if the file object 500 is dragged and dropped into the display area 230*a*, the multi-function device 40 is unable to execute printing. In this case, the PC 10 is capable of displaying a file object 510 that indicates that printing cannot be performed. The file object 510 has an address (file name) 512 "report.jpg". This address 512 has an extension (jpg) differing from that of the address 502.

Figure 16:
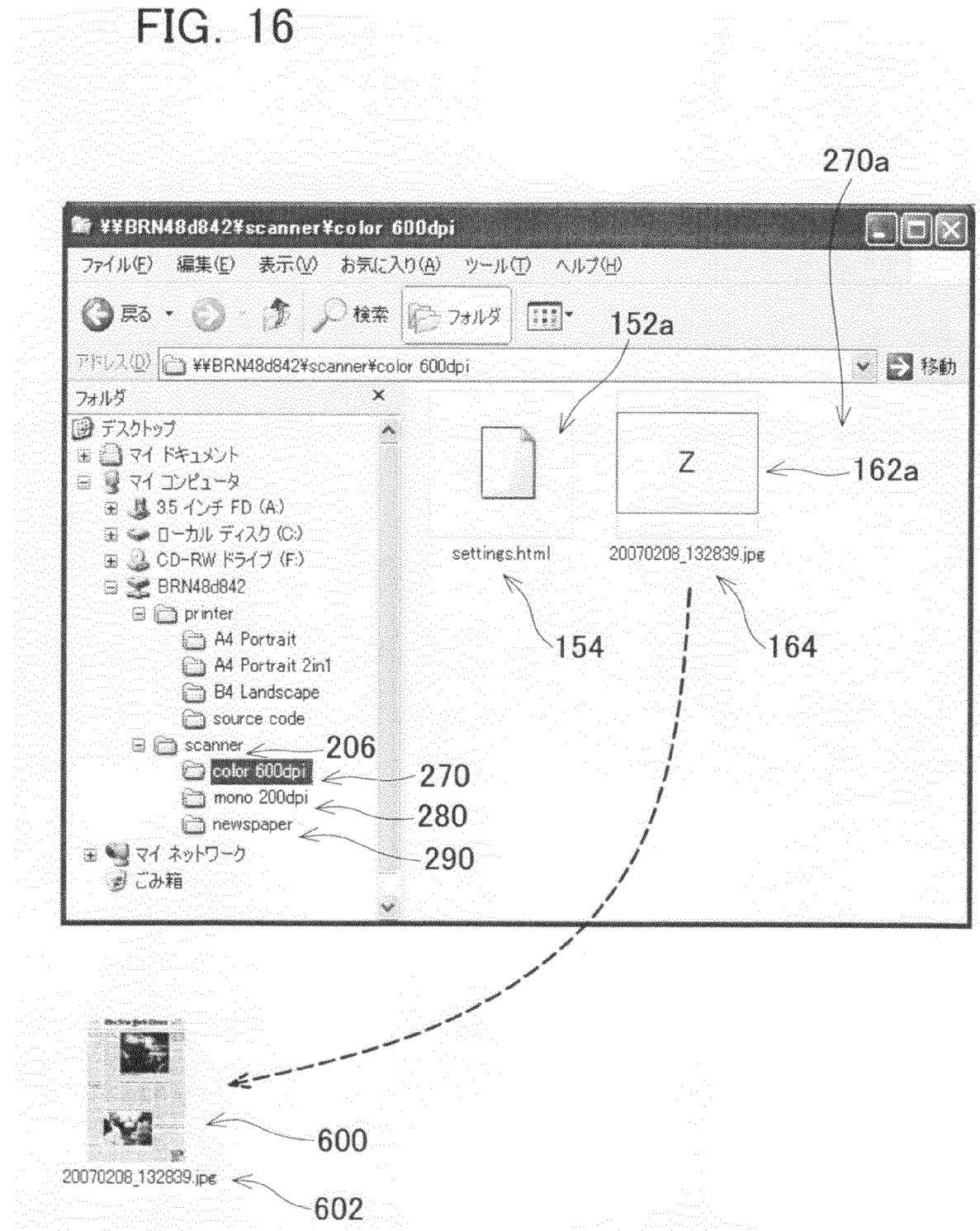
FIG. 16 shows how a subordinate file of a "color 600 dpi" folder is copied to another location.

Display data related to printing has been described in detail. Next, display data related to scanning will be described with reference to FIG. 16. Moreover, like FIG. 5, etc., FIG. 16 is based on Explorer (file management software) included in Windows (registered trademark) of the Microsoft Corporation. The user can double click on the folder object 206. A file object (not shown) that is identical to the file object 82*a* of FIG. 5 is thereby displayed. The user can double click on this file object, whereby a scan setting window (not shown) is displayed. The user can input scan setting data into the scan setting window. For example, scanning resolution can be input. Further, for example, it is possible to select the type of scan image from among color scanning, black and white scanning, and gray scale, and to input this selection. Further, for example, it is possible to select the scan data format (JPEG, TIFF, PDF, etc.), and to input this selection. The subordinate folders 150, 170, etc. of the folder 140 (see FIG. 3) are thus created in the multi-function device 40. In the example in FIG. 16, folder objects 270, 280, and 290 are displayed that correspond to the folders 150, 170, etc. The folder object 270 corresponds to the folder 150, and the folder object 280 corresponds to the folder 170. In FIG. 3, a folder to which the folder object 290 corresponds has been omitted.

In the case where scanning is to be performed, the user executes the following operations. First, the user sets a document of a scanning subject in the document tray 50 (see FIG. 1). Next, the user selects the folder corresponding to the desired scan setting data. For example, in the case where scanning will be executed utilizing "color 600 dpi", the user double clicks on the folder object 270. In this case, a display area 270*a* that refers to the interior of the folder object 270 is displayed. File objects 152*a* and 162*a* are displayed in the display area 270*a*. The file object 152*a* corresponds to the file 152 (see FIG. 3). The file object 152*a* has the address (file name) 154 "settings.html". The file object 162*a* corresponds to the file 162 (see FIG. 3). The file object 162*a* has the address (file name) 164 "20070208_132839.jpg".

The displayed contents of the file object 162*a* depend on the setting reflected image data 166 (see FIG. 3) of the file 162. For example, the setting reflected image data 166 also becomes color image data in the case where color scanning has been selected by the user, and as a result the file object 162*a* is also displayed by a color image. Further, in the case for example where black and white scanning has been selected by the user, the file object 162*a* is also displayed by a black and white image. The file object 162*a* is not a scanned image of the document set in the document tray 50, but is created based on a sample image stored in advance in the storage area 62. As described above, the address 164 includes the date and time when the file object 162 was created. Further, the address 164 includes an extension of the format of the scan data selected by the user (in the example of FIG. 16, this is the JPEG extension "jpg"). The address 164 can be said to include a character string to which the scan setting data input by the user is reflected.

The user can double click on the file object 152*a*, thereby changing the scan setting data in the scan setting window. This point is identical with the case where the print setting data is changed.

The user can copy the file object 162*a* to any location outside the display area 270*a* (for example, to the desktop). The multi-function device 40 thus scans the document set in the document tray 50. The PC 10 is capable of displaying a scan file object 600 that corresponds to the scan data at a copy destination. The displayed contents of the scan file object 600 depend on the scanned data. As described above, the displayed contents of the file object 162*a* depend on the sample image data. Consequently, the scan file object 600 that depends on the scanned data has displayed contents differing from those of the file object 162*a*. The scan file object 600 has an address 602 that is identical with the address 164 of the file object 162*a*.

(Commands Sent from PC)

The data displayed in the PC 10 when the user executes operations has been described in detail. Next, the commands sent from the PC 10 to the multi-function device 40 will be described in detail. As described above, the PC 10 and the multi-function device 40 are capable of communicating utilizing the WebDAV protocol. Various types of commands are utilized in the WebDAV protocol. Below, some commands relating to the present embodiment will be described. Moreover, the "POST command" below is not a communication command of the WebDAV protocol, but is an HTTP communication command. The other commands are communication commands of the WebDAV protocol.

FIG. 17 shows operations that the user can perform on the PC 10, and commands that are sent from the PC 10 to the multi-function device 40 in accordance with those operations.

(1) In the case where the folder object 204 shown in FIG. 5 is double clicked on, a PROPFIND command including the address "/printer" is sent to the multi-function device 40.

(2) In the case where the folder object 206 shown in FIG. 5 or FIG. 16 is double clicked on, a PROPFIND command including the address "/scanner" is sent to the multi-function device 40.

(3) In the case where the file object 82a shown in FIG. 5 is double clicked on, a GET command including the address "/printer/new_settings.html" is sent to the multi-function device 40.

(4) In the case where any of the folder objects 230, 240, 250, or 260 shown in FIG. 8 is double clicked on, a PROPFIND command including the address "/printer/folder name" is sent to the multi-function device 40. For example, in the case where the folder object 230 is double clicked on, a PROPFIND command including the address "/printer/A4 Portrait" is sent to the multi-function device 40.

(5) In the case where any of the folder objects 270, 280, or 290 shown in FIG. 8 or FIG. 16 is double clicked on, a PROPFIND command including the address "/scanner/folder name" is sent to the multi-function device 40. For example, in the case where the folder object 270 is double clicked on, a PROPFIND command including the address "/scanner/color 600dpi" is sent to the multi-function device 40.

(6) In the case where the file object 92a shown in FIG. 7 is double clicked on, a GET command including the address "/printer/folder name/settings.html" is sent to the multi-function device 40. In the example of FIG. 7, a GET command including the address "/printer/A4 Portrait/settings.html" is sent to the multi-function device 40.

(7) In the case where the file object 82a shown in FIG. 5 is double clicked on, the print setting data 224a, 224b, 224c, etc. is input to the print setting window 220 (see FIG. 6), and the OK button 226 is clicked, a POST command including the address "/printer/new_settings.html" is sent to the multi-function device 40. That is, the POST command including this address is sent to the multi-function device 40 in the case where new print setting data has been input. In this case, the print setting data 224a, 224b, 224c, etc. that has been input is also sent to the multi-function device 40. By contrast, in the case where the file object 112a shown in FIG. 8 is double clicked on, the print setting data 324a, 324b, 324c, etc. of the print setting window 320 (see FIG. 9) is changed, and the OK button 326 is clicked, a POST command including the address "/printer/folder name/settings.html" is sent to the multi-function device 40. That is, the POST command including this address is sent to the multi-function device 40 in the case where the print setting data has been changed. In this case, the print setting data 324a, 324b, 324c, etc. that has been changed is also sent to the multi-function device 40. Moreover, in the case where an OK button of the scan setting window (not shown) is clicked on, a POST command including the address "/scanner/new_settings.html" or "/scanner/folder name/settings.html" is sent to the multi-function device 40.

(8) In the case where the file objects 400 and 420 shown in FIG. 11 and FIG. 13 have been dragged and dropped into the display area 230a, a PUT command including the address "/printer/folder name" is sent to the multi-function device 40. For example, in the case of the examples of FIG. 11 and FIG. 13, a PUT command including the address "/printer/A4 Por-trait 2 in 1" is sent to the multi-function device 40. In this case, image data files corresponding to the file objects 400 and 420 are also sent to the multi-function device 40. Further, in the case where the file object 500 shown in FIG. 15 is dragged and dropped into the display area 230a, as well, a PUT command including the address "/printer/folder name" is sent to the multi-function device 40. In this case, a document data file corresponding to the file object 500 is also sent to the multi-function device 40.

(9) In the case where the file object 162a shown in FIG. 16 has been copied from the display area 270a to another location, a GET command including the address "/scanner/folder name" is sent to the multi-function device 40. For example, in the example of FIG. 16, a GET command including the address "scanner/color 600dpi" is sent to the multi-function device 40.

(Processes Executed by Multi-Function Device)

Next, the contents of processes executed by the multi-function device 40 will be described in detail. The processes below are executed by the CPU 54 (see FIG. 1) of the multi-function device 40.

(Main Process)

Figure 18:
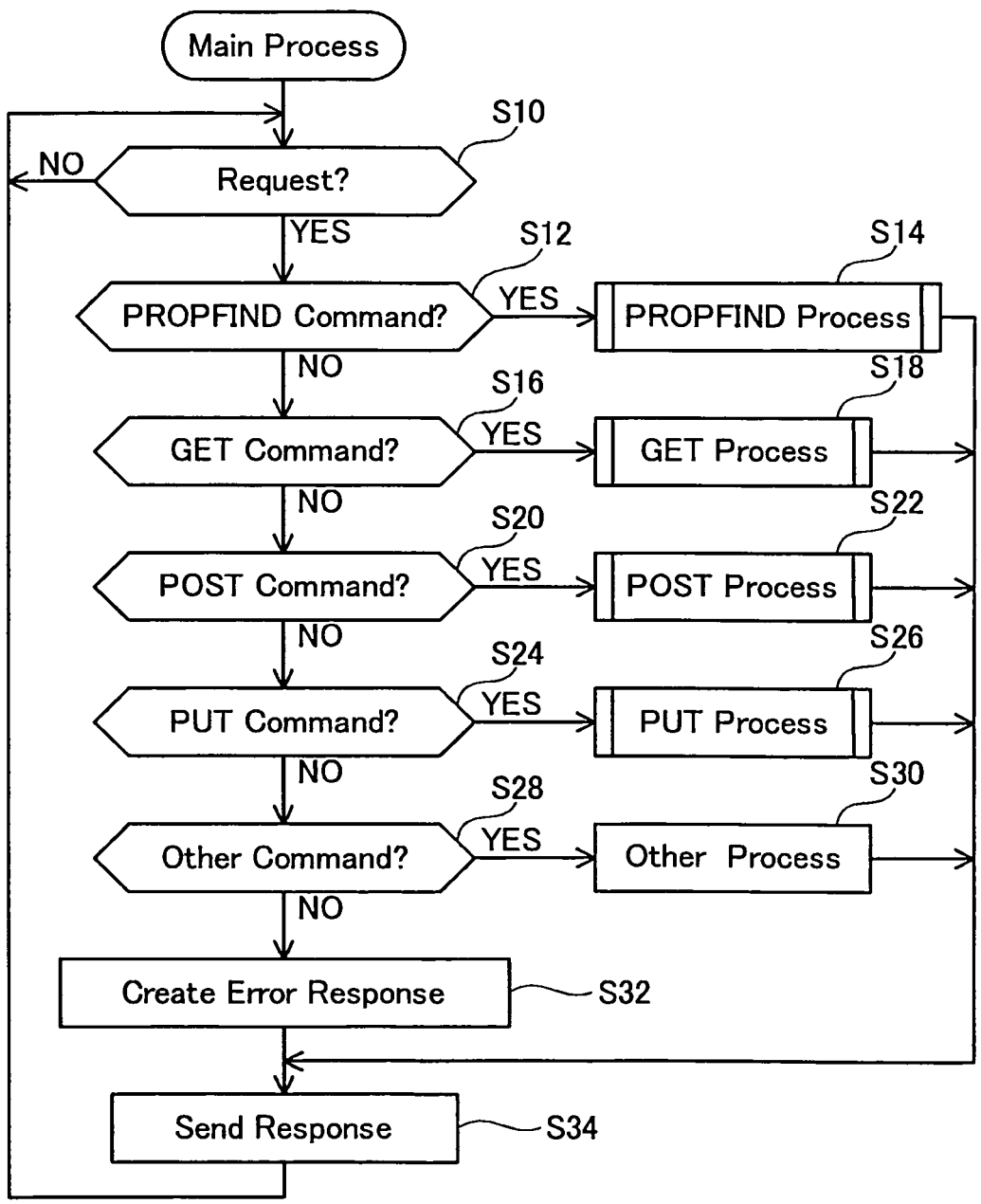
FIG. 18 shows a flow chart of a main process of a multi-function device.

FIG. 18 shows a flow chart of a main process. The CPU 54 monitors whether a request (command) has been made from the PC 10 (S10). In the case of YES in S10, the process proceeds to S12. In S12, the CPU 54 determines whether the request from the PC 10 is the PROPFIND command. In the case of YES in S12, the CPU 54 executes a PROPFIND process (S14). In the case of NO in S12, the CPU 54 determines whether the request from the PC 10 is the GET command (S16). In the case of YES in S16, the CPU 54 executes a GET process (S18). In the case of NO in S16, the CPU 54 determines whether the request from the PC 10 is the POST command (S20). In the case of YES in S20, the CPU 54 executes a POST process (S22). In the case of NO in S20, the CPU 54 determines whether the request from the PC 10 is the PUT command (S24). In the case of YES in S24, the CPU 54 executes a PUT process (S26).

In the case of NO in S24, the CPU 54 determines whether the request from the PC 10 is another command (S28). In the case of YES in S28, the CPU 54 executes a process in accordance with the command (S30). In the case of NO in S28, the CPU 54 creates an error response (S32). In this case, the CPU 54 executes a process to send the error response to the PC 10 (S34). Moreover, in the case where S14, S18, S22, S26, and S30 have been executed, the CPU 54 sends a response in S34 that has been created in each of the respective processes.

(PROPFIND Process)

Figure 19:
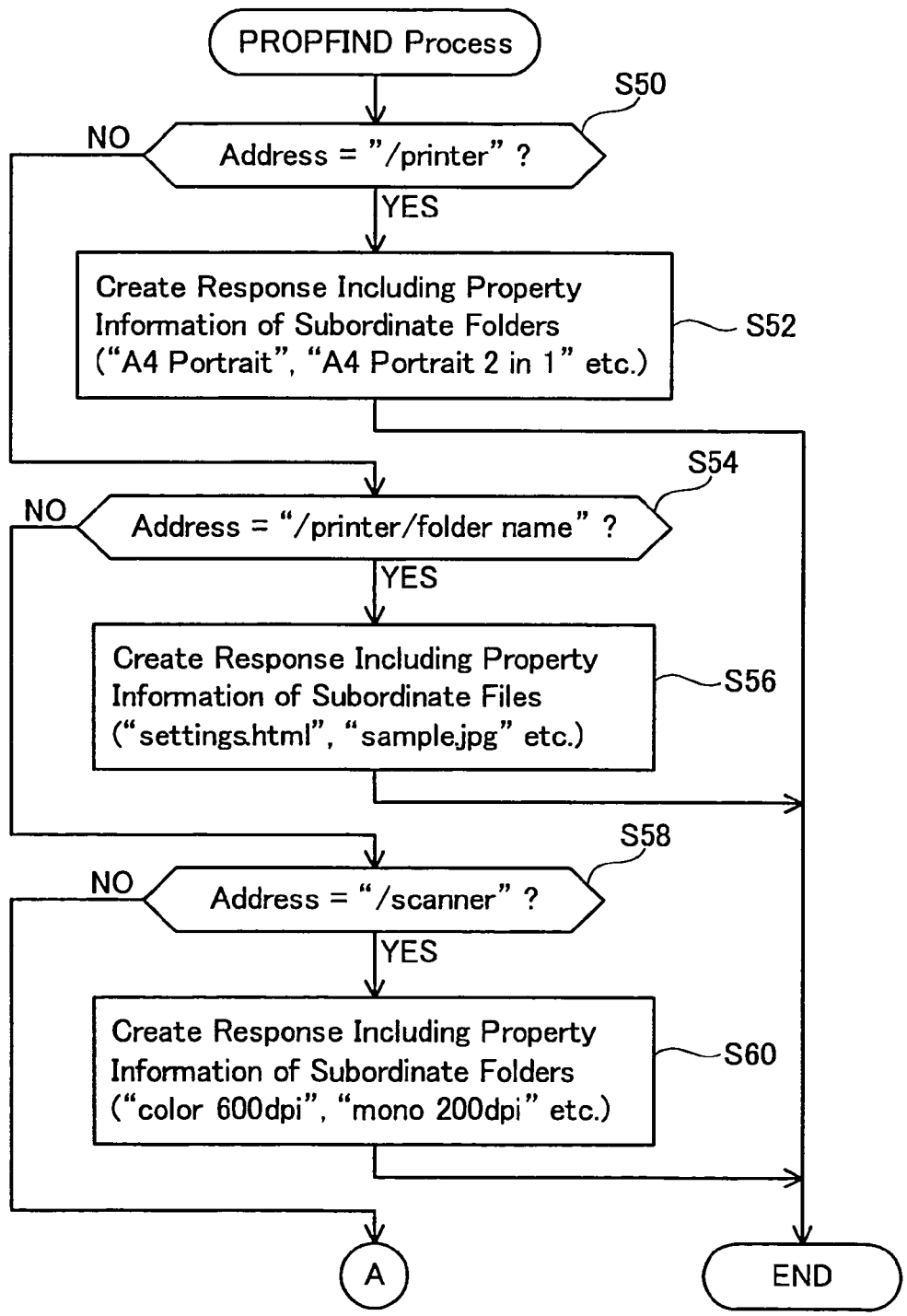
FIG. 19 shows a flow chart of a PROPFIND process.

The PROPFIND process of S14 of FIG. 18 will now be described. FIG. 19 shows a flow chart of the PROPFIND process. The CPU 54 determines whether the address included in the PROPFIND command is "printer" (S50). That is, it is determined whether a PROPFIND command corresponding to (1) of FIG. 17 has been received. In the case of YES in S50, the CPU 54 creates a response (S52) that includes property information of the folders 90, 110, etc. (see FIG. 2) and the file 82 (see FIG. 2) that have the folder address "printer" of the folder 80 as the superior address. That is, the CPU 54 creates a response that includes the property information of the subordinate folders 90, 110, etc. and the subordinate file 82 of the folder 80. Specifically, the CPU 54 creates a response that includes the folder address "A4 Portrait" of the folder 90, the folder address "A4 Portrait 2 in 1" of the folder 110, the file address 84 "new_settings.html" of the file 82, etc. These responses are sent to the PC 10 (see S34 of FIG. 18). The PC 10 can thus recognize the existence of the subordinate folders 90, 110, etc. and the subordinate file 82 of the folder 80. As a result, the PC 10 can display the folder objects 230, 240, 250, and 260 (see FIG. 8). Further, the PC 10 can display the file object 82a (see FIG. 5).

In the case of NO in S50, the CPU 54 determines whether the address included in the PROPFIND command is "printer/ folder name" (S54). That is, it is determined whether a PROPFIND command corresponding to (4) of FIG. 17 has been received. In the case of YES in S54, the CPU 54 creates a response (S56) that includes property information of files that have the folder address (folder name) included in the PROPFIND command as the superior address. For example, in the case where the address included in the PROPFIND command is "printer/A4 Portrait", the CPU 54 creates a response that includes property information of the subordinate files 92 and 102 (see FIG. 2) of the folder 90. In the case of this example, the CPU 54 creates a response that includes the file address 94 "settings.html" of the file 92 and the file address 104 "sample.jpg" of the file 102. Moreover, the setting reflected image data 106 of the file 102 is also included in this response. This response is sent to the PC 10 (see S34 of FIG. 18). As a result, the PC 10 can display the file objects 92a and 102a (see FIG. 7).

In the case of NO in S54, the CPU 54 determines whether the address included in the PROPFIND command is "scanner" (S58). That is, it is determined whether a PROPFIND command corresponding to (2) of FIG. 17 has been received. In the case of YES in S58, the CPU 54 creates a response (S60) that includes property information of the folders 150, 170, etc. (see FIG. 3) and the file 142 (see FIG. 3) that have the folder address "scanner" of the folder 140 as the superior address. Specifically, the CPU 54 creates a response that includes the folder address "color 600 dpi" of the folder 150, the folder address "mono 200 dpi" of the folder 170, the file address 144 "new_settings.html" of the file 142, etc. This response is sent to the PC 10 (see S34 of FIG. 18). As a result, the PC 10 can display the folder objects 270, 280, and 290 (see FIG. 16). Further, the PC 10 can display the file object corresponding to the file 142 (not shown: see 82a of FIG. 5).

Figure 20:
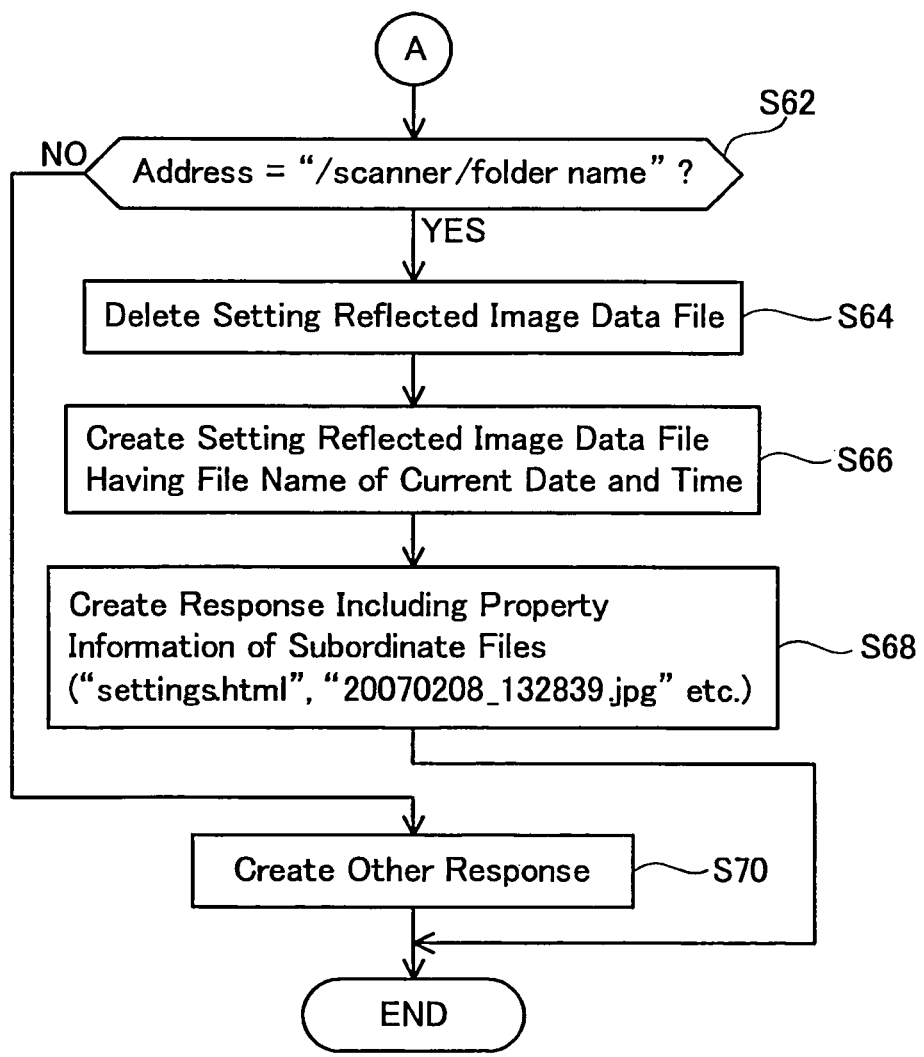
FIG. 20 shows a continuation of the flow chart of FIG. 19.

In the case of NO in S58, the process proceeds to S62 of FIG. 20. In S62, the CPU 54 determines whether the address included in the PROPFIND command is "scanner/folder name". That is, it is determined whether a PROPFIND command corresponding to (5) of FIG. 17 has been received. In the case of NO in S62, the CPU 54 creates another type of response that corresponds to the PROPFIND command (S70). In the case of YES in S62, the CPU 54 deletes (S64) a setting reflected image data file that has the folder address (folder name) included in the PROPFIND command as the superior address. For example, in the case where the address included in the PROPFIND command is "scanner/color 600 dpi", the CPU 54 deletes the file 162 (the file address 164 and the setting reflected image data 166). Moreover, the file 152 is not deleted. Below, the process of S66 and S68 executed in the case of this example will be described.

The CPU 54 creates a setting reflected image data file (S66) having a file name (file address) with the current date and time. For example, in the case where the current date is Feb. 8, 2007, and the current time is 13:28:39, the CPU 54 creates the file address 164 "20070208_132839.jpg" (see FIG. 3). Further, the CPU 54 creates the setting reflected image data 166 (see FIG. 3). The file 162 is thus created that is an association of the file address 164 and the setting reflected image data 166. Moreover, the setting reflected image data 166 is created as follows: a sample image has been stored in advance in the storage area 62 (see FIG. 1). By performing processing on the sample image in accordance with the setting data 156 (see FIG. 2), the CPU 54 creates the setting reflected image data 166. This processing can be performed utilizing various known methods. For example, in the case where the sample image is a color image, this can be changed into a black and white image or a gray scale image. Further, by changing the size of the sample image, the setting reflected image data can also be created to which the resolution is reflected.

Next, the CPU 54 creates a response (S68) including property information of the files 152 and 162 (see FIG. 3) that have the folder address "color 600dpi" of the folder 150 as the superior address. Specifically, the CPU 54 creates a response including the file address 154 "settings.html" of the file 152 and the file address 164 "20070208_132839.jpg" of the file 162. Moreover, the setting reflected image data 166 of the file 162 is also included in this response. This response is sent to the PC 10 (see S34 of FIG. 18). As a result, the PC 10 can display the file objects 152a and 162a (see FIG. 16).

(GET Process)

Figure 21:
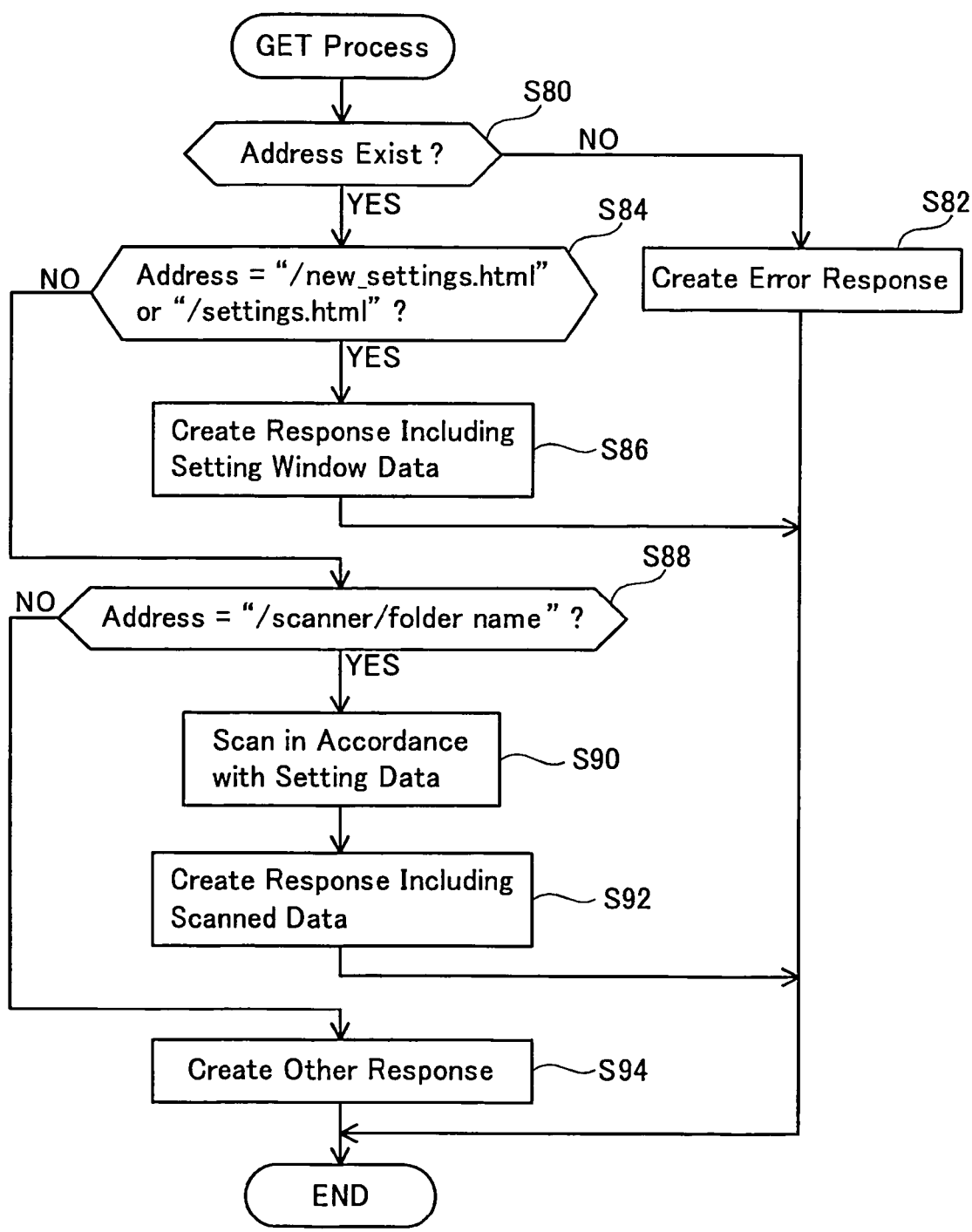
FIG. 21 shows a flow chart of a GET process.

The GET process of S18 of FIG. 18 will now be described. FIG. 21 shows a flow chart of the GET process. The CPU 54 determines (S80) whether an address included in the GET command exists in the setting folder storage area 60 (see FIG. 1). In the case of NO in S80, the CPU 54 creates an error response (S82). In the case of YES in S80, the CPU 54 determines whether the address included in the GET command is "new_settings.html" or "settings.html" (S84). That is, it is determined whether a GET command corresponding to (3) or (6) of FIG. 17 has been received. In the case of YES in S84, the CPU 54 creates a response (S86) that includes setting window data (or setting data) of the file corresponding to the file address included in the GET command. For example, in the case where the address included in the GET command is "printer/new_settings.html", the CPU 54 creates a response that includes the setting window data 86 (see FIG. 2). This response is sent to the PC 10 (see S34 of FIG. 18). As a result, the PC 10 can display the setting window 220 (see FIG. 6). Further, in the case for example where the address included in the GET command is "printer/A4 portrait 2 in 1/settings.html", the CPU 54 creates a response that includes the setting data 116 (see FIG. 2). This response is sent to the PC 10 (see S34 of FIG. 18). As a result, the PC 10 can display the print setting window 320 (see FIG. 9) in which the setting data 324a, 324b, 324c, etc. previously input by the user is reflected.

Moreover, the process of S86 is identical in the case of "scanner". For example, in the case where the address included in the GET command is "scanner/new_settings.html", the CPU 54 creates a response that includes the setting window data 146 (see FIG. 3). Further, in the case for example where the address included in the GET command is "scanner/color 600 dpi/settings.html", the CPU 54 creates a response that includes the setting data 156 (see FIG. 3).

In the case of NO in S84, the CPU 54 determines whether the address included in the GET command is "scanner/folder name" (S88). That is, it is determined whether a GET command corresponding to (9) of FIG. 17 has been received. In the case of NO in S88, the CPU 54 creates another type of response that corresponds to the GET command (S94). In the case of YES in S88, the CPU 54 executes scanning (S90) in accordance with the setting data of the file that has the folder address included in the GET command as the superior address. For example, in the case where the address included in the GET command is "scanner/color 600 dpi", the CPU 54 executes scanning in accordance with the setting data 156 (see FIG. 3). That is, the CPU 54 orders the scan device 48 (see FIG. 1) to execute scanning based on the setting data 156. Further, in the case for example where the address included in the GET command is "scanner/mono 200 dpi", the CPU 54 executes scanning in accordance with the setting data 176 (see FIG. 3). When the process of S90 is executed, the scan device 48 scans the document mounted on the document tray 50 (see FIG. 1), and creates scanned data.

Next, the CPU 54 creates (S92) a response that includes the scan data created in S90. This response is sent to the PC 10 (see S34 of FIG. 18). As a result, the PC 10 can obtain the scan data, and can display the scan file object 600 (see FIG. 16).

(POST Process)

Figure 22:
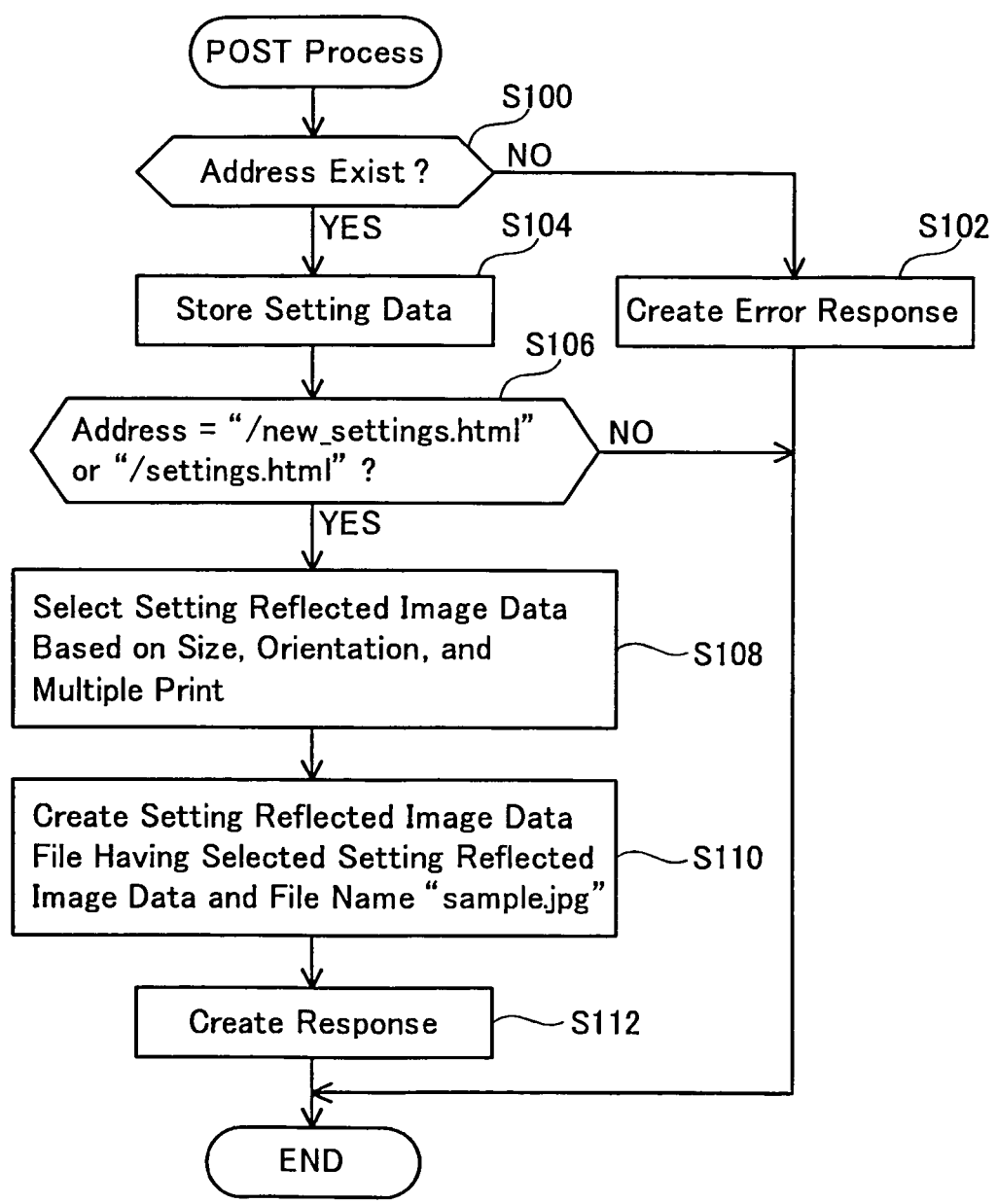
FIG. 22 shows a flow chart of a POST process.

The POST process of S22 of FIG. 18 will now be described. FIG. 22 shows a flow chart of the POST process. The CPU 54 determines (S100) whether an address included in the POST command exists in the setting folder storage area 60 (see FIG. 1). In the case of NO in S100, the CPU 54 creates an error response (S102). In the case of YES in S100, the CPU 54 stores the data received with the POST command (mainly setting data) temporarily in the storage area 62 (S104). Next, the CPU 54 determines whether the address included in the POST command is "new_settings.html" or "settings.html" (S106). That is, it is determined whether a POST command corresponding to (7) of FIG. 17 has been received. In the case of YES in S106, the CPU 54 executes S108 to S112.

In the case where the address included in the POST command is "new_settings.html", the CPU 54 executes a process (S108) for selecting the setting reflected image data from the setting reflected image storage area 62a (see FIG. 1 and FIG. 4) based on the setting data received with the POST command. For example, in the case where the received setting data is that of the example of FIG. 6 "A4, Portrait, Normal", the CPU 54 selects the setting reflected image data 72a (see FIG. 4) associated with the address 70a from the setting reflected image storage area 62a. Further, in the case for example where the received setting data is "A4, Landscape, Normal", the CPU 54 selects the setting reflected image data 72b (see FIG. 4) associated with the address 70b from the setting reflected image storage area 62a.

Next, the CPU 54 creates a folder having a folder address that includes text (the text input into the text input area 222 in FIG. 6) included in the received setting data. For example, in the case of the text "A4 Portrait" in the example of FIG. 6, the CPU 54 creates the folder 90 (see FIG. 2) having the folder address "printer/A4 Portrait" in which "printer" is the superior address. The CPU 54 stores the folder address "printer/A4 Portrait" in the setting folder storage area 60 (see FIG. 1). The folder 90 is thus created. Further, the CPU 54 creates a file having a file address in which the created folder address is the superior address. For example, in the case where the folder 90 was created, the CPU 54 creates the two files 92 and 102 (see FIG. 2) that have "printer/A4 Portrait" as the superior address. The CPU 54 stores an association of the file address 94 and the setting data 96 (the setting data that was temporarily stored in S104) in the setting folder storage area 60. The file 92 is thus created. Further, the CPU 54 stores an association of the file address 104 and the setting reflected image data 106 (the setting reflected image data that was selected in S108) in the setting folder storage area 60. The file 102 is thus created. When S110 ends, the CPU 54 creates a response (S112) showing that the POST process has ended.

In the case where the address included in the POST command is "settings.html", the CPU 54 deletes the folder corresponding to the address before executing S108. For example, in the case where the address included in the POST command is "A4 portrait/settings.html", the CPU 54 deletes the folder 90, the file 92, and the file 102 (see FIG. 2) from the setting folder storage area 60. Then S108 to S112 are executed. A file having changed setting data (for example, the file 92) and a file having setting reflected image data to which the changed setting data is reflected (for example, the file 102) can thus be created.

Further, the POST process is executed in a substantially identical manner in the case of "scanner". For example, in the case where the address included in the POST command is "scanner/new_settings.html", the CPU 54 creates a folder (for example, the folder 150) and a file (for example, the file 152). In this case, a file having setting reflected image data (for example, the file 162) is not created. This is because the setting reflected image data is created in the PROPFIND process (see S66 of FIG. 20).

(PUT Process)

Figure 23:
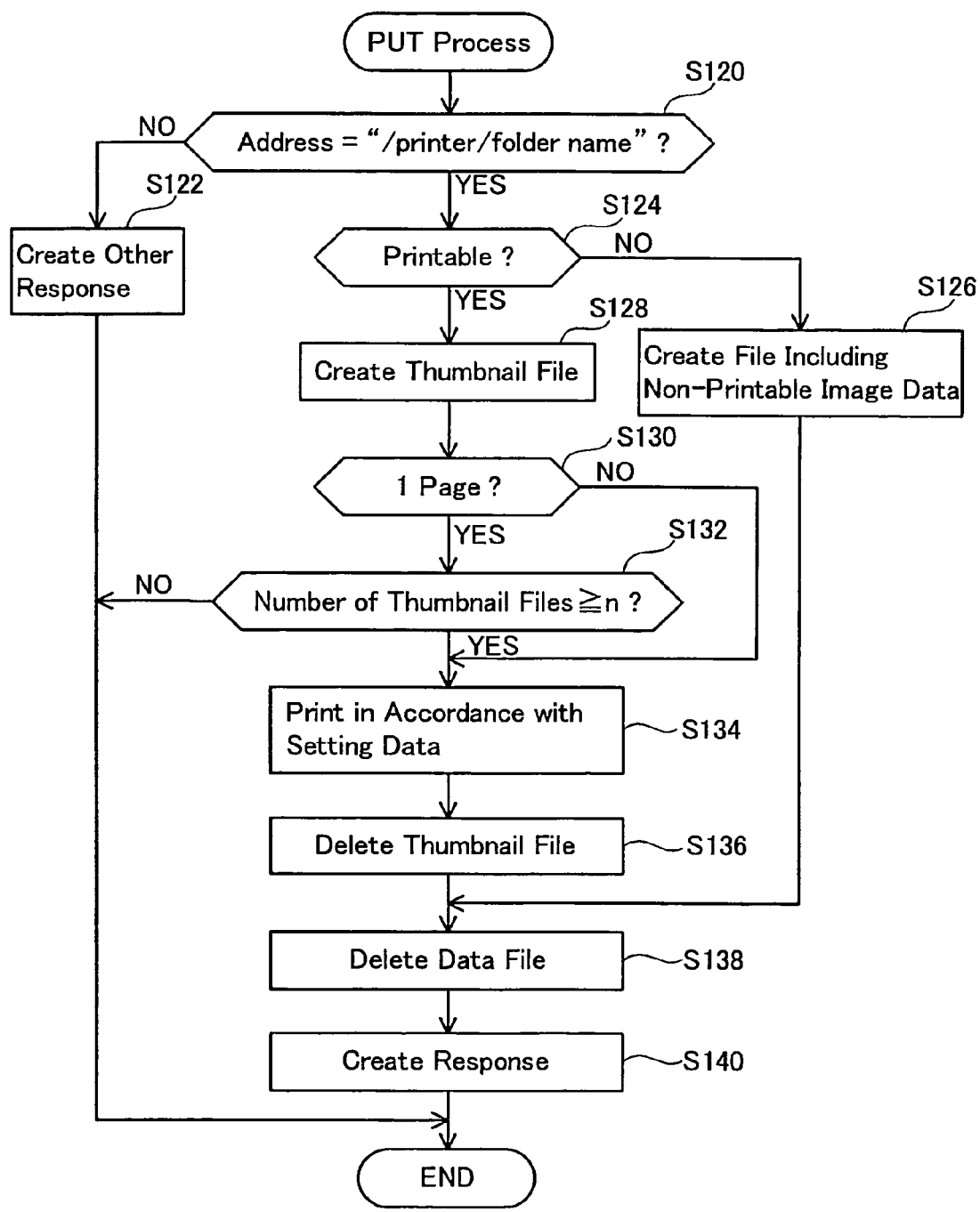
FIG. 23 shows a flow chart of a PUT process.

The PUT process of S26 of FIG. 18 will now be described. FIG. 23 shows a flow chart of the PUT process. The CPU 54 determines (S120) whether an address included in the PUT command is "printer/folder name". That is, it is determined whether a PUT command corresponding to (8) of FIG. 17 has been received. In the case of NO in S120, the CPU 54 creates another response corresponding to the PUT command (S122). In the case of YES in S120, the CPU 54 determines whether a data file received together with the PUT command is printable (S124). That is, it is determined whether the received data file can be rasterized by the printer driver 58. As described above, the printer driver 58 is capable of rasterizing image data files such as JPEG, etc. However, the printer driver 58 is not capable of rasterizing document data files. The determination of S124 is made based on the extension of the received data file. For example, in the case where the received data file has the extension "jpg", YES is determined in S124. In the case where the received data file has the extension "doc", NO is determined in S124.

In the case of NO in S124, the CPU 54 creates a file (S126) in which the folder address (folder name) included in the PUT command is the superior address. The file address of this file includes a character string other than the extension that is present in the file address of the received data file. For example, in the case where the file object 500 shown in FIG. 15 has been dragged and dropped into the display area 230a, a PUT command including the file address 502 "report.doc" is sent to the multi-function device 40. In this case, a file address "report.jpg" is created in S126 that includes the character string "report" that is present in addition to the character string "doc" in the file address 502. This file address has the folder address included in the PUT command as the superior address (for example, "A4 Portrait 2 in 1"). In the case of this example, "printer/A4 Portrait 2in1/report.jpg" is created. The CPU 54 stores an association of the created file address and non-printable image data (not shown) stored in advance in the storage area 62 (see FIG. 1) in the setting folder storage area 60 (see FIG. 1). A file including the non-printable image data is thus created. In the case where the folder object corresponding to the folder in which this file is the subordinate file is double clicked on in the PC 10, the PC 10 sends the PROPFIND command to the multi-function device 40. In this case, the multi-function device 40 sends a response including property information of the file including the non-printable image data to the PC 10. The PC 10 can thus display the file object 510 (see FIG. 15). The displayed contents of the file object 510 depend on the non-printable image data created in S126. When S126 ends, the CPU 54 deletes (S138) the data file that was received together with the PUT command (this data file being temporarily stored in for example the storage area 62 (see FIG. 1)). Next, the CPU 54 creates a response (S140).

In the case of YES in S124, the CPU 54 creates a thumbnail file (S128). For example, in the case where the file object 400 shown in FIG. 11 has been dragged and dropped into the display area 230a, a JPEG image data file (JPEG image data and the file address 402) corresponding to the file object 400 is sent to the multi-function device 40. In this case, a file address "photo1.jpg" that is identical with the file address 402 is created in S128. This file address has the folder address included in the PUT command (for example, "A4 portrait 2 in 1") as the superior address. In the case of this example, "printer/A4 portrait 2 in 1/photo1.jpg" is created. The CPU 54 creates thumbnail image data by reducing the received JPEG image data to a predetermined data size. This predetermined data size is set in advance as a data size that can be displayed as a thumbnail by the PC 10. The CPU 54 stores an association of the created file address and the thumbnail image data in the setting folder storage area 60 (see FIG. 1). The thumbnail file is thus created. In the case where a folder object corresponding to a folder having the thumbnail file as the subordinate address is double clicked on in the PC 10, the PC 10 sends the PROPFIND command to the multi-function device 40. In this case, the multi-function device 40 sends a response including property information of the thumbnail file to the PC 10. As a result, the PC 10 can display the thumbnail file object 410 (see FIG. 11). The displayed contents of the thumbnail file object 410 depend on the thumbnail image data created in S128.

Next, the CPU 54 determines whether the received data file is one page worth of data file (S130). For example, an image data file such as JPEG, etc. is treated as one page worth of data file. As a result, in the case where the file object 400 shown in FIG. 11 has been dragged and dropped into the display area 230a, YES is determined in S130. In this case, the CPU 54 determines (S132) whether the number of thumbnail files (see S128) having the folder address included in the PUT command as the superior address is equal to or greater than n, "n" being specified based on the multiple page (N in 1) printing. That is, in the case of "2 in 1", "n" is 2. The CPU 54 specifies "n" (for example, 2) by referring to setting data (for example, the setting data 116) of a setting data file (for example, the file 112 of FIG. 2) that has the folder address included in the PUT command as the superior address. In the case of this example, the CPU 54 determines in S132 that the number of thumbnail files having the folder address "A4 Portrait 2in1" included in the PUT command as the superior address is equal to or greater than 2. In the case where NO is determined in S132, the CPU 54 ends the PUT process. That is, in the case of NO in S132, a printing process (S134: to be described) is not executed.

In the case for example where the file object 420 shown in FIG. 13 has been dragged and dropped into the display area 230a, two thumbnail files are created in S128. YES is therefore determined in S132. In this case, the printing process of S134 is executed. Further, the printing process of S134 is also executed in the case of NO in S130. In S134, the CPU 54 executes the printing process in accordance with the setting data of the setting date file that has the folder address included in the PUT command as the superior address. For example, in the case where the address included in the PUT command is "printer/A4 Portrait 2in1", the CPU 54 executes printing in accordance with the setting data 116 (see FIG. 2). That is, the CPU 54 orders the print device 46 (see FIG. 1) to print based on the setting data 116. Further, in the case for example where the address included in the PUT command is "printer/A4 Portrait", the CPU 54 executes printing in accordance with the setting data 96 (see FIG. 2). When S134 is executed, the data file received together with the PUT command is printed on printing paper. Moreover, rasterizing of the data file may be executed in S134, or may be executed in an earlier step (for example, in S128). When S134 ends, the CPU 54 deletes (S136) the thumbnail file (the thumbnail image data and the file address) created in S128. Next, the CPU 54 deletes (S138) the data file (the data file of the print subject) received together with the PUT command. The CPU 54 creates a response (S140), and the PUT process ends.

Processes of the multi-function device 40 that were not described utilizing the flow charts of FIG. 18 to FIG. 23 will now be described. As shown in FIG. 10, when the folder object 204 is double clicked in the PC 10, the folder objects 230b, 240b, etc. (and the file objects 102a and 122a) are displayed in the display area 204a. When the folder object 204 is double clicked on, the PC 10 sends the PROPFIND command including the folder address "printer" to the multi-function device 40. This point is the same as (1) of FIG. 17. The user can select a mode in the PC 10 for displaying the display area 204a or a mode for not displaying the display area 204a. In the case where the former mode has been set, the PC 10 sends the PROPFIND command to the multi-function device 40 and also sends the GET command to the multi-function device 40. As a result, the multi-function device 40 (the CPU 54) executes the process of S52 of FIG. 19, and executes a GET process not displayed in FIG. 21. In this GET process, the multi-function device 40 sends the setting reflected image data 106, 126, etc. (see FIG. 2) of the folders 90, 110, etc. to the PC 10. The PC 10 can thus create the file objects 102a, 122a, etc. (see FIG. 10) from the setting reflected image data 106, 126, etc. The PC 10 can display the file object 102a overlapped on the folder object 230b, and can display the file object 122a overlapped on the folder object 240b.

The multi-function device system 2 of the present embodiment has been described in detail. The multi-function device 40 of the present embodiment can store a plurality of patterns of setting data (the print setting data 96, 116, etc. (see FIG. 2), the scan setting data 156, 176, etc. (see FIG. 3)). The user can store the desired setting data in the multi-function device 40. Each item of setting data is associated with a folder address. For example, the setting data 96 is associated with the file address 94 that has the folder address "A4 Portrait" as the superior address. The multi-function device 40 can send the folder addresses of the setting folders 90, 110, 150, 170, etc. to the PC 10 in accordance with the PROPFIND command. As a result, the PC 10 can display the folder objects 230, 240, 250, 260, 270, 280, 290, etc. (see FIG. 8) that correspond respectively to the setting folders 90, 110, 150, 170, etc.

The user can store the file object of the data file of the print subject in the folder object that corresponds to the desired print setting data. For example, in the case of the example of FIG. 11, the user can store the file object 400 in the folder object 230 that corresponds to the print setting data 116. The PUT command can thus be sent from the PC 10 to the multi function device 40. The folder address "A4 Portrait 2 in 1" of the folder object 230 is included in the PUT command. As a result, the multi-function device 40 can recognize that a data file has been stored in the print setting folder 110. The multi-function device 40 can perform printing of the data file in accordance with the print setting data 116 of the print setting folder 110 in which the data has been stored. With the present embodiment, it is possible to send a data file of a print subject from the PC 10 to the multi-function device 40 utilizing the WebDAV protocol. Furthermore, the user can easily utilize the desired print setting data from among the plurality of patterns of print setting data 96, 116, etc. that are being stored in the multi-function device 40.

Further, the setting reflected image data 166, 186, etc. corresponding to the scan setting folders 150, 170, etc. are created by the multi-function device 40. As shown in FIG. 16, the PC 10 can thereby display the file object 162a. By copying the file object 162a to a different location, the user can cause scanning to be executed utilizing the scan setting data 156 that corresponds to the folder 150. With the present embodiment, it is possible to order scanning from the PC 10 to the multi-function device 40 utilizing the WebDAV protocol. Furthermore, the user can easily utilize the desired scan setting data from among the plurality of patterns of scan setting data 156, 176, etc. that are being stored in the multi-function device 40.

The multi-function device 40 can store the file 82 shown in FIG. 2. As a result, as shown in FIG. 5, the PC 10 can display the file object 82a (i.e. a shortcut object corresponding to the setting window data 86). The user can obtain the print setting window 220 by double clicking on the file object 82a. The user can input the print setting data 224a, 224b, 224c, etc. into the print setting window 220. The folders 90, 110, etc. are thereby created anew in the multi-function device 40. With this configuration, the user can easily create folders corresponding to the desired setting data.

Further, the multi-function device 40 creates the setting reflected image data 106, 126, 166, 186, etc. The PC 10 can thereby display the file objects 102a, 122a, 162a, etc. (see FIGS. 7, 8, 10, and 16). By looking at the file objects 102a, 122a, 162a, etc., the user can easily understand the contents of the setting data corresponding to the folders thereof.

Further, the multi-function device 40 can create thumbnail files by reducing the image data files of the print subjects (see S128 of FIG. 23). The PC 10 can thereby display the file objects 410 and 430 (see FIGS. 11 and 13) to which the thumbnail files have been reflected. The thumbnail files that have a small data size are sent from the multi-function device 40 to the PC 10. It is thus possible to compress the amount of data sent from the multi-function device 40 to the PC 10 in order to display thumbnails.

Further, in the present embodiment, the print setting data and the scan setting data are stored in the multi-function device 40 and are not stored in the PC 10. Conversely, a configuration is possible in which the setting data is stored in the PC 10 and this setting data is sent to the multi-function device 40. However, this configuration is not effective in the case where the multi-function device 40 is shared by a plurality of PCs. For example, the same user may utilize a plurality of PCs. In this case, the user must store the setting data that is frequently utilized in all of the PCs. To deal with this, the configuration has been adopted in the present embodiment in which the setting data is stored in the multi-function device 40. The user does not need to store the setting data in each of the PCs. If the setting data is stored in the multi-function device 40, the user can utilize this setting data to execute printing and scanning from any PC.

Further, the multi-function device 40 may not execute S136 in FIG. 23. In this case, the thumbnail file is maintained in the setting folder storage area 60. If the PC 10 sends the PROPFIND command to the multi-function device 40, the multi-function device 40 is capable of sending the thumbnail file to the PC 10. The user can obtain the thumbnail file object (for example, 410 and 430 in FIG. 13). The user can refer to the thumbnail file object when the user determines a print setting.

A part of technique disclosed in the above embodiments will be described below. The printer may provide window data to the information processing device, this window data being for inputting print setting data. In order to realize this, the following configuration may be adopted. That is, the printer may further comprise a print setting window file storage area that stores a print setting window file. The print setting window file may be an association of print setting window data for inputting the print setting data and a print setting window file address. The data sending device may be capable of sending the print setting window file address to the information processing device. The information processing device may thus display a file object corresponding to the print setting window file. The user may execute a predetermined operation (clicking, for example) on the file object. As a result, a get command may be sent from the information processing device to the printer. This get command may include the print setting window file address. The data receiving device may receive the get command. In this case, the data sending device may send the print setting window data associated with the print setting window file address included in the get command to the information processing device. With this configuration, the printer can provide the print setting window data to the information processing device. The user can input the print setting data in accordance with the print setting window data that is being displayed by the information processing device.

The data receiving device may be capable of receiving print setting data that was input in accordance with the print setting window data. In this case, the printer may further comprise a first storage control device. In the case where the print setting data is received by the data receiving device, the first storage control device may store a print setting folder in the print setting folder storage area, the print setting folder being an association of the print setting data and a print setting folder address. With this configuration, the printer can create the print setting folder based on the print setting data that the user has input to the information processing device. Moreover, there is no particular restriction on the method of determining the folder address of the print setting folder (specifically, the folder name). For example, the printer may determine the folder address of the print setting folder based on text included in the print setting data. It may be possible for the user to input this text to the information processing device.

The printer may further comprise a second storage control device. The second storage control device may store, for each print setting folder, a setting reflected image data file in the print setting folder storage area. Each setting reflected image data file may be an association of setting reflected image data to which the print setting data of the print setting folder is reflected, and a setting reflected image file address that includes the print setting folder address of the print setting folder as its superior address. For example, in the case where the print setting folder address is "aaa/bbb", the setting reflected image file address may be "aaa/bbb/ccc". Further, the term "setting reflected image data to which the print setting data is reflected" refers to image data to which at least one setting item included in the print setting data is reflected. For example, in the case where the print setting data includes paper size and printing resolution, image data to which the paper size is reflected and the printing resolution is not reflected can also be termed setting reflected image data. The data sending device may be capable of sending each setting reflected image data file (i.e. the setting reflected image data and the setting reflected image file address) to the information processing device. The information processing device may thus display the setting reflected image data as a subordinate file of the print setting folder (i.e. as a file stored in the print setting folder). The user can easily understand the print setting data of the print setting folder by looking at the setting reflected image data.

The printer may further comprise a third storage control device. The third storage control device may execute the following processes:

(1) creating reduced image data by reducing the data file included in the combination data received by the data receiving device to a predetermined data size.

(2) storing a reduced image data file in the print setting folder storage area. The reduced image data file is an association of the reduced image data and a reduced image file address including the print setting folder address included in the combination data as its superior address.

In this case, the data sending device may be capable of sending the reduced image data file (i.e. the reduced image data and the reduced image file address) to the information processing device. With this configuration, the information processing device may thus display the reduced image data as a subordinate file of the print setting folder (i.e. as a file stored in the print setting folder).

The printer may further comprise a deletion device that deletes the data file printed by the print device. The reduced image data file may be maintained in the print setting folder storage area after the deletion device deletes the data file printed by the print device. In this configuration, the user can refer to the reduced image data file when the user determines a print setting.

The print setting folder storage area may be capable of storing an N in 1 print setting folder including N in 1 print setting data which indicates that data of N pages is to be printed on one page (N being an integer more than 1). In this case, the print device may execute a printing process in accordance with the N in 1 print setting data in the case where the following condition is satisfied:

(1) one or more combination data including a print setting folder address of the N in 1 print setting folder is received by the data receiving device; and (2) a total number of pages of a data file or data files included in the one or more combination data is equal to N or more.

Many printers print one image data file onto one page of print medium. That is, one image data file may be treated as one page of data. In the case where an image data file is to be printed in accordance with the N in 1 print setting data, the print device may operate as follows: in the case where a predetermined combination data including the print setting folder address of the N in 1 print setting folder and an image data file is received by the data receiving device, (1) the print device does not print until another predetermined combination data is received by the data receiving device another (N−1) times and (2) the print device prints in the case where another predetermined combination data is received by the data receiving device another (N−1) times. With this configuration, a plurality of image data files (N number of image data files) can be printed onto one page of print medium.

The printer may further comprise a determination device that determines whether the data file included in the combination data is printable, and a fourth storage control device that stores a predetermined data file in the print setting folder storage area in a case where the determination device determines that the data file included in the combination data is not printable. The predetermined data file may be an association of image data showing non-printable and a file address including the print setting folder address included in the combination data as its superior address. In this configuration, the user can know that the data file is not printable if the user looks the image data of the predetermined data file. Further, the fourth storage control device may create the file address of the predetermined data file by changing an extension of a file address of the data file included in the combination data into a predetermined extension.

The scanner may further comprise a storage control device. The storage control device may store, for each scan setting folder, a setting reflected image data file in the scan setting folder storage area. Each setting reflected image data file may be an association of setting reflected image data to which the scan setting data of the scan setting folder is reflected, and a setting reflected image file address including the scan setting folder address of the scan setting folder as its superior address. The data sending device may be capable of sending each setting reflected image data file to the information processing device. The predetermined command may include the setting reflected image file address. In the case where the predetermined command is received by the data receiving device, the scan device may perform scanning in accordance with the scan setting data associated with the scan setting folder address which is the superior address of the setting reflected image file address included in the predetermined command. The user can easily understand the scan setting data of the scan setting folder by looking at the setting reflected image data.

The print setting folder storage area may be capable of storing a print setting file for each print setting folder. Each print setting file may be an association of print setting data and a print setting file address including the print setting folder address of the print setting folder as its superior address. With this configuration, the print setting data is associated with the print setting file address including the print setting folder address as its superior address. In this case, as well, it can be said that "the print setting data and the print setting folder address are associated".

The scan setting folder storage area may be capable of storing a scan setting file for each scan setting folder. Each scan setting file may be an association of scan setting data and a scan setting file address including the scan setting folder address of the scan setting folder as its superior address. With this configuration, the scan setting data is associated with the scan setting file address including the scan setting folder address as its superior address. In this case, as well, it can be said that "the scan setting data and the scan setting folder address are associated".

The printer may comprise a printer driver that creates bitmap data by rasterizing a data file sent from the information processing device.

In the case where combination data including a data file and a data file storage command that includes the print setting folder address has been received by the data receiving device, the printer may (1) determine whether the data file included in the combination data is a data format that can be rasterized by the printer driver, and (2) in the case where this is a data format that cannot be rasterized, store a non-printable image data file in the print setting folder storage area. The non-printable image data file may be an association of image data showing that printing cannot be performed and a non-printable image file address including the print setting folder address as its superior address.

The printer or the scanner may be capable of receiving a property obtaining command sent from the information processing device. In the case of the WebDAV protocol, the property obtaining command may be a PROPFIND command.

The printer or the scanner may be capable of receiving an obtaining command sent from the information processing device. In the case of the WebDAV protocol, the obtaining command may be a GET command.

The printer or the scanner may be capable of receiving a data file storage command sent from the information processing device. In the case of the WebDAV protocol, the data file storage command may be a PUT command.

The printer or the scanner may be capable of receiving a data storage directive command sent from the information processing device. In the case of HTTP, the data storage directive command may be a POST command.

The present embodiment has been described in detail above, however this is simply an illustration. The specific example illustrated above includes various modifications and changes. For example, a file sharing protocol other than the WebDAV protocol may be utilized. For example, an SMB (Server Message Block) protocol may be utilized. Further, an information processing device other than the PC 10 may be utilized. The information processing device may be any type of device as long as it is capable of communication utilizing a file sharing protocol and has at least a display device. For example, a portable telephone, a portable music reproduction device, a PDA, etc. may be utilized.

What is claimed is:

1. A printer configured to communicate with an information processing device by utilizing a file sharing protocol, the printer comprising:
a print setting folder storage area configured to store a plurality of print setting folders in a hierarchical structure, wherein each print setting folder is an association of print setting data including a plurality of print setting items and a print setting folder address;
a data sending device configured to send the print setting folder address of each print setting folder stored in the print setting folder storage area to the information processing device;
a data receiving device configured to receive combination data sent from the information processing device, the combination data including a data file storage command and a data file, the data file storage command including a print setting folder address;
a print device configured to print, in a case where the combination data is received by the data receiving device, the data file included in the combination data in accordance with the plurality of print setting items included in the print setting data associated with the print setting folder address included in the combination data;
a print setting window file storage area configured to store a print setting window file in the hierarchical structure, wherein the print setting window file is an association of print setting window data for inputting the plurality of print setting items and a print setting window file address and the print setting window file is not subordinate to any of the plurality of print setting folders in the hierarchical structure and none of the plurality of print setting folders is subordinate to the print setting window file; and
a first storage control device,
wherein the data sending device is configured to send the print setting window file address to the information processing device,
the data receiving device is configured to receive a get command sent from the information processing device, the get command including the print setting window file address,
in a case where the get command is received by the data receiving device, the data sending device is configured to send the print setting window data associated with the print setting window file address included in the get command to the information processing device,
the data receiving device is configured to receive the print setting data sent from the information processing device, wherein the received print setting data includes the plurality of print setting items which has been input by a user in accordance with the print setting window data, and
in a case where the print setting data is received by the data receiving device, the first storage control device is configured to store a print setting folder which is an association of the received print setting data including the plurality of print setting items and a print setting folder address in the print setting folder storage area.

2. The printer as in claim 1, further comprising:
a second storage control device, wherein the second storage control device stores, for each print setting folder, a setting reflected image data file in the print setting folder storage area, each setting reflected image data file being an association of setting reflected image data to which the print setting data of the print setting folder is reflected, and a setting reflected image file address including the print setting folder address of the print setting folder as its superior address, and
wherein the data sending device is configured to send each setting reflected image data file to the information processing device.

3. The printer as in claim 1, further comprising:
a second storage control device, wherein the second storage control device creates reduced image data by reducing the data file included in the combination data received by the data receiving device to a predetermined data size, and stores a reduced image data file in the print setting folder storage area, the reduced image data file being an association of the reduced image data and a reduced image file address including the print setting folder address included in the combination data as its superior address, and
wherein the data sending device is configured to send the reduced image data file to the information processing device.

4. The printer as in claim 3, further comprising:
a deletion device that deletes the data file printed by the print device,
wherein the reduced image data file is maintained in the print setting folder storage area after the deletion device deletes the data file printed by the print device.

5. The printer as in claim 1, wherein
the print setting folder storage area is configured to store an N in 1 print setting folder including N in 1 print setting data which indicates that data of N pages is to be printed on one page, N being an integer more than 1, and
in a case where the following condition is satisfied:
(1) one or more combination data including a print setting folder address of the N in 1 print setting folder is received by the data receiving device; and
(2) a total number of pages of a data file or data files included in the one or more combination data is equal to N or more,
the print device prints the data file or the data files included in the one or more combination data in accordance with the N in 1 print setting data.

6. The printer as in claim 5, wherein
in a case where a predetermined combination data including the print setting folder address of the N in 1 print setting folder and an image data file is received by the data receiving device, the print device does not print until another predetermined combination data is received another (N−1) times, and the print device prints in a case where another predetermined combination data is received another (N−1) times.

7. The printer as in claim 1, further comprising:
a deletion device that deletes the data file printed by the print device.

8. The printer as in claim 1, further comprising:
a determination device that determines whether the data file included in the combination data is printable; and
a second storage control device that stores a predetermined data file in the print setting folder storage area in a case where the determination device determines that the data file included in the combination data is not printable, wherein the predetermined data file is an association of image data that is non-printable and a file address including the print setting folder address included in the combination data as its superior address.

9. The printer as in claim 8, wherein the second storage control device creates the file address of the predetermined data file by changing an extension of a file address of the data file included in the combination data into a predetermined extension.

10. A non-transitory computer readable medium storing a computer program for a printer configured to communicate with an information processing device by utilizing a file sharing protocol, the computer program including instructions that when executed by a computer cause the printer to perform operations comprising:
storing a plurality of print setting folders in a predetermined storage area in a hierarchical structure, wherein each print setting folder is an association of print setting data including a plurality of print setting items and a print setting folder address;
sending the print setting folder address of each print setting folder stored in the predetermined storage area to the information processing device;
receiving combination data sent from the information processing device, the combination data including a data file storage command and a data file, the data file storage command including a print setting folder address;
printing, in a case where the combination data is received, the data file included in the combination data in accordance with the plurality of print setting items included in the print setting data associated with the print setting folder address included in the combination data,
storing a print setting window file in the hierarchical structure, wherein the print setting window file is an association of print setting window data for inputting the plurality of print setting items and a print setting window file address and the print setting window file is not subordinate to any of the plurality of print setting folders in the hierarchical structure and none of the plurality of print setting folders is subordinate to the print setting window file; and
sending the print setting window file address to the information processing device,
receiving a get command sent from the information processing device, the get command including the print setting window file address,
in a case where the get command is received, sending the print setting window data associated with the print setting window file address included in the get command to the information processing device,
receiving the print setting data sent from the information processing device, wherein the received print setting data includes the plurality of print setting items which has been input by a user in accordance with the print setting window data, and
in a case where the print setting data is received, storing a print setting folder which is an association of the received print setting data including the plurality of print setting items and a print setting folder address.

11. A scanner configured to communicate with an information processing device by utilizing a file sharing protocol, the scanner comprising:
a scan setting folder storage area configured to store a plurality of scan setting folders in a hierarchical structure, wherein each scan setting folder is an association of scan setting data including a plurality of scan setting items and a scan setting folder address;
a data sending device configured to send the scan setting folder address of each scan setting folder stored in the scan setting folder storage area to the information processing device;
a data receiving device configured to receive a predetermined command sent from the information processing device, the predetermined command including a scan setting folder address;
a scan device configured to scan, in a case where the predetermined command is received by the data receiving device, in accordance with the plurality of scan setting items included in the scan setting data associated with the scan setting folder address included in the predetermined command;
a scan setting window file storage area configured to store a scan setting window file in the hierarchical structure, wherein the scan setting window file is an association of scan setting window data for inputting the plurality of scan setting items and a scan setting window file address and the scan setting window file is not subordinate to any of the plurality of scan setting folders in the hierarchical structure and none of the plurality of scan setting folders is subordinate to the scan setting window file; and
a first storage control device,
wherein the data sending device is configured to send the scan setting window file address to the information processing device,
the data receiving device is configured to receive a get command sent from the information processing device, the get command including the scan setting window file address,
in a case where the get command is received by the data receiving device, the data sending device is configured to send the scan setting window data associated with the scan setting window file address included in the get command to the information processing device,
the data receiving device is configured to receive the scan setting data sent from the information processing device, wherein the received scan setting data includes the plurality of scan setting items which has been input by a user in accordance with the scan setting window data, and
in a case where the scan setting data is received by the data receiving device, the first storage control device is configured to store a scan setting folder which is an association of the received scan setting data including the plurality of scan setting items and a scan setting folder address in the scan setting folder storage area.

12. The scanner as in claim 11, further comprising:
a second storage control device, wherein the storage control device stores, for each scan setting folder, a setting reflected image data file in the scan setting folder storage area, each setting reflected image data file being an association of setting reflected image data to which the scan setting data of the scan setting folder is reflected, and a setting reflected image file address including the scan setting folder address of the scan setting folder as its superior address, and the data sending device is configured to send each setting reflected image data file to the information processing device, the predetermined command includes a setting reflected image file address, in the case where the predetermined command is received by the data receiving device, the scan device scans in accordance with the scan setting data associated with the scan setting folder address which is the superior address of the setting reflected image file address included in the predetermined command.

13. A non-transitory computer readable medium storing a computer program for a scanner configured to communicate with an information processing device by utilizing a file sharing protocol, the computer program including instructions, that when executed by a computer cause the scanner to perform:

storing a plurality of scan setting folders in a predetermined storage area in a hierarchical structure, wherein each scan setting folder is an association of scan setting data including a plurality of scan setting items and a scan setting folder address;

sending the scan setting folder address of each scan setting folder stored in the predetermined storage area to the information processing device;

receiving a predetermined command sent from the information processing device, the predetermined command including a scan setting folder address;

scanning, in a case where the predetermined command is received, in accordance with the plurality with the plurality of scan setting including in the scan setting data associated with the scan setting folder address included in the predetermined command;

storing a scan setting window file in the hierarchical structure, wherein the scan setting window file is an association of scan setting window data for inputting the plurality of scan setting items and a scan setting window file address and the scan setting window file is not subordinate to any of the plurality of scan setting folders in the hierarchical structure and none of the plurality of scan setting folders is subordinate to the scan setting window file;

sending the scan setting window file address to the information processing device, receiving a get command sent from the information processing device, the get command including the scan setting window file address, in a case where the get command is received, sending the scan setting window data associated with the scan setting window file address included in the get command to the information processing device, receiving the scan setting data sent from the information processing device, wherein the received scan setting data includes the plurality of scan setting items which has been input by a user in accordance with the scan setting window data, and in a case where the scan setting data is received, storing a scan setting folder which is an association of the received scan setting data including the plurality of scan setting items and a scan setting folder address.

* * * * *